US012700754B2

(12) United States Patent
Munson et al.

(10) Patent No.: US 12,700,754 B2
(45) Date of Patent: Aug. 4, 2026

(54) SYSTEMS AND METHODS FOR MONITORING EQUIPMENT

(71) Applicant: Fluid Power AI, LLC, San Diego, CA (US)

(72) Inventors: Brenton Parr Munson, San Diego, CA (US); Francis Mitchell Toglia, San Diego, CA (US); Jose Maria Guadalupe Gomez, San Diego, CA (US)

(73) Assignee: Fluid Power AI, LLC, San Diego, CA (US)

( * ) Notice: Subject to any disclaimer, the term of this patent is extended or adjusted under 35 U.S.C. 154(b) by 588 days.

(21) Appl. No.: 18/333,037

(22) Filed: Jun. 12, 2023

(65) Prior Publication Data

US 2024/0265238 A1      Aug. 8, 2024

Related U.S. Application Data

(60) Provisional application No. 63/497,280, filed on Apr. 20, 2023, provisional application No. 63/483,744, filed on Feb. 7, 2023.

(51) Int. Cl.
| | |
|---|---|
| *G06N 3/00* | (2023.01) |
| *G06N 3/0455* | (2023.01) |
| *H02J 13/12* | (2026.01) |
| *G06N 10/00* | (2022.01) |

(52) U.S. Cl.
CPC ............ *H02J 13/12* (2026.01); *G06N 3/0455* (2023.01)

(58) Field of Classification Search
CPC ........ G06N 3/045; G06N 3/0455; G06N 3/00; G06N 5/00; G06N 7/00; G06N 10/00; G06N 20/00; G06N 99/00; H02J 13/12

USPC ........................... 706/22, 15, 16, 25, 26, 27
See application file for complete search history.

(56) References Cited

U.S. PATENT DOCUMENTS

| | | | |
|---|---|---|---|
| 6,199,018 | B1 | 3/2001 | Quist et al. |
| 6,591,244 | B2 | 7/2003 | Jim et al. |
| 6,823,289 | B2 | 11/2004 | Kasuya et al. |
| 7,308,322 | B1 | 12/2007 | Discenzo et al. |
| 8,843,328 | B2 | 9/2014 | Curtiss, III |
| 9,051,945 | B2 | 6/2015 | Hague |
| 9,275,536 | B2 | 3/2016 | Wetherill et al. |
| 9,443,195 | B2 | 9/2016 | Micali et al. |

(Continued)

FOREIGN PATENT DOCUMENTS

WO        2022236064 A2    11/2022

OTHER PUBLICATIONS

T. J. Ham et al., "ELSA: Hardware-Software Co-design for Efficient, Lightweight Self-Attention Mechanism in Neural Networks," 2021 ACM/IEEE 48th Annual International Symposium on Computer Architecture (ISCA), Valencia, Spain, 2021, pp. 692-705, doi: 10.1109/ISCA52012.2021.00060. keywords: {Runtime;Computational modeling;Graphics processing units;Artificial neural networks;Hardware;Energy efficiency;Natural language processing;attention;hardware accelerator;neural network}.

(Continued)

*Primary Examiner* — Daquan Zhao

(57) ABSTRACT

Systems and methods for monitoring apparatus(es) and equipment using a sensor cluster are described. The systems and methods can be used to automatically repair or otherwise address actual and predicted failure modes of the apparatus(es).

16 Claims, 10 Drawing Sheets

(56)                References Cited

U.S. PATENT DOCUMENTS

| | | | |
|---|---|---|---|
| 9,699,529 B1 | 7/2017 | Petri et al. | |
| 9,739,813 B2 | 8/2017 | Houlette et al. | |
| 9,797,801 B2 | 10/2017 | Batcheller et al. | |
| 9,835,594 B2 | 12/2017 | Yoskovitz et al. | |
| 10,175,276 B2 | 1/2019 | Fishburn et al. | |
| 10,330,647 B2 | 6/2019 | Yoskovitz et al. | |
| 10,345,056 B2 | 7/2019 | Rollins et al. | |
| 10,452,978 B2 | 10/2019 | Shazeer et al. | |
| 10,712,738 B2 | 7/2020 | Cella et al. | |
| 10,907,722 B2 | 2/2021 | Besser et al. | |
| 10,962,955 B2 * | 3/2021 | Gomez | G01K 13/026 |
| 10,983,097 B2 | 4/2021 | Yoskovitz et al. | |
| 11,188,065 B2 | 11/2021 | Vedula | |
| 11,263,172 B1 * | 3/2022 | Chang | G06F 16/128 |
| 11,493,379 B2 | 11/2022 | Yoskovitz et al. | |
| 11,493,482 B2 | 11/2022 | Rudyk et al. | |
| 11,544,557 B2 | 1/2023 | Freed et al. | |
| 11,556,121 B2 | 1/2023 | Negri et al. | |
| 2002/0046006 A1 | 4/2002 | Qian et al. | |
| 2005/0096873 A1 | 5/2005 | Klein | |
| 2014/0114612 A1 | 4/2014 | Yoskovitz et al. | |
| 2018/0113218 A1 | 4/2018 | Albers et al. | |
| 2018/0145377 A1 * | 5/2018 | Zheng | H02J 7/34 |
| 2019/0384255 A1 | 12/2019 | Krishnaswamy et al. | |
| 2020/0225655 A1 | 7/2020 | Cella et al. | |
| 2020/0252500 A1 * | 8/2020 | Giordano | G06F 18/214 |
| 2021/0270778 A1 | 9/2021 | Yoskovitz et al. | |
| 2022/0011763 A1 | 1/2022 | Negri et al. | |
| 2022/0019200 A1 * | 1/2022 | Drews | G05B 19/41835 |
| 2022/0334573 A1 | 10/2022 | Negri et al. | |
| 2022/0363404 A1 | 11/2022 | Auerbach et al. | |
| 2023/0394823 A1 * | 12/2023 | Weng | B60W 60/00276 |

OTHER PUBLICATIONS

T. J. Ham et al., "ELSA: Hardware-Software Co-design for Efficient, Lightweight Self-Attention Mechanism in Neural Networks," 2021 ACM/IEEE 48th Annual International Symposium on Computer Architecture (ISCA), Valencia, Spain, 1 2021, pp. 692-705, doi: 10.1109/ISCA52012.2021.00060. keywords: {Runtime;Computational modeling;Graphics processing units;Artificial neural networks;Hardware;Energy efficiency;Natural language processing;attention;hardware accelerator;neural network}.

* cited by examiner

System 100

Housing 150

ISOMETRIC
VIEW

Signal Conditioning
And
Communications 130

Vibration
Sensor 112

Mounting
Interface 120

CUT VIEW

Method 300

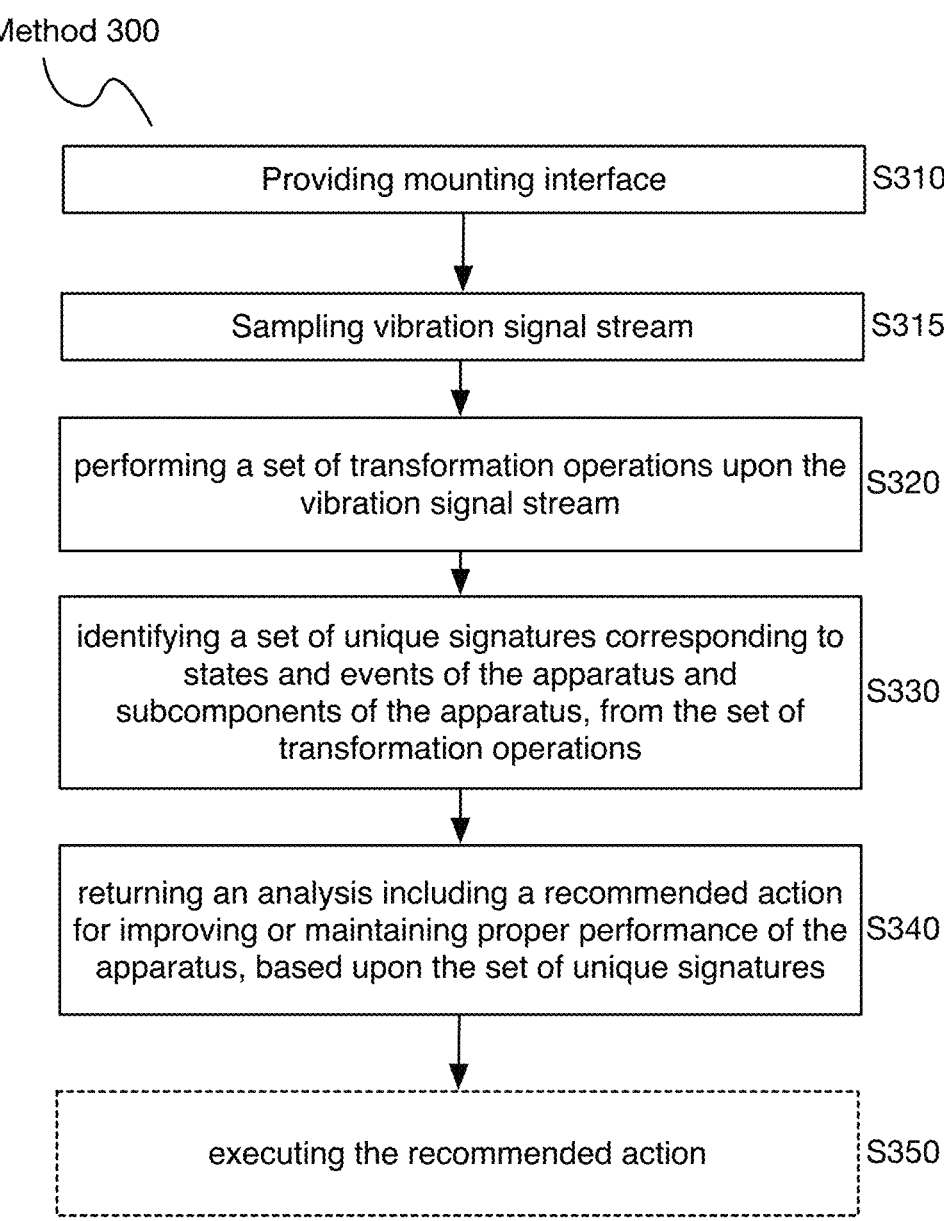

Providing mounting interface    S310

Sampling vibration signal stream    S315 performing a set of transformation operations upon the vibration signal stream    S320 identifying a set of unique signatures corresponding to states and events of the apparatus and subcomponents of the apparatus, from the set of transformation operations    S330 returning an analysis including a recommended action for improving or maintaining proper performance of the apparatus, based upon the set of unique signatures    S340 executing the recommended action    S350

FIGURE 3

SYSTEMS AND METHODS FOR MONITORING EQUIPMENT

CROSS-REFERENCE TO RELATED APPLICATIONS

This application claims the benefit of U.S. Provisional Application No. 63/483,744 filed on 7 Feb. 2023 and U.S. Provisional Application No. 63/497,280 filed on 20 Apr. 2023, which are each incorporated in its entirety herein by this reference.

TECHNICAL FIELD

This invention relates generally to fields related to equipment monitoring, and more specifically to new and useful systems and methods for monitoring equipment events at subcomponent and global levels, with generation of analyses to improve system maintenance and operation.

BACKGROUND

The commercial utilization of and ongoing costs of maintaining equipment in industrial settings and other sectors is greatly impacted by proper maintenance practices that include regular service and replacement of system components. Furthermore, the technical domain knowledge required to properly troubleshoot and diagnose these complex systems is not readily available to the majority of equipment owners and operators that rely on these systems to produce their core products and/or provide services. The high opportunity cost of equipment downtime and the lack of resources to properly diagnose electrical systems, systems involving rotating equipment, and other types of equipment produces reactive maintenance practices where equipment is utilized in non-ideal states for long periods of time before finally failing, often catastrophically. Without the proper tools and domain expertise, technicians are typically under pressure to replace components in order to return equipment to service with minimal downtime, once there is a failure event, but do not resolve the root cause of failure. This leads to accelerated system wear that results in an endless costly battle to keep systems in production. Consequences of equipment downtime and costs of repair have also been amplified significantly by supply chain issues resulting from past and current world events.

Unexpected downtime and poor system efficiency thus have associated costs that can be prevented or reduced with better monitoring, forecasting and troubleshooting systems. Current solutions for full system monitoring that can diagnose subcomponent issues in various types of equipment use many distributed sensors and custom algorithms. Implementing these options requires application-specific domain expertise, and the resources to design, deploy and maintain equipment is typically a non-optimal solution for equipment owners and operators.

Thus, there is a need in fields implementing various types of equipment to create new, scalable, and useful systems and methods for evaluating system events at subcomponent and global levels, with generation of analyses to improve system operation and maintenance effectively lowering total cost of ownership and maximize production output.

BRIEF DESCRIPTION OF THE FIGURES

FIG. 3 depicts an embodiment of a method for apparatus monitoring.

INCORPORATION BY REFERENCE

Figure 1A:
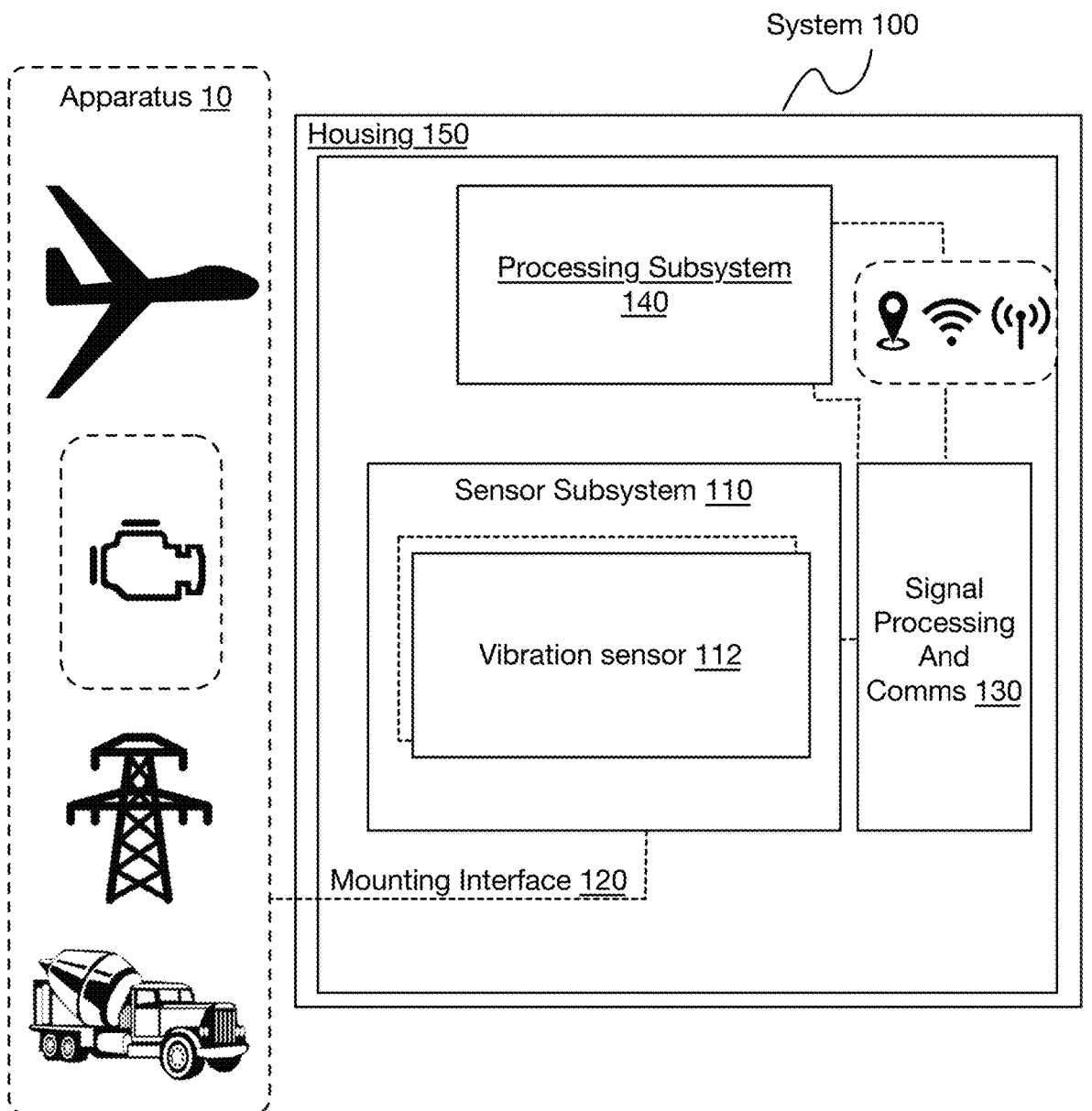
FIG. 1A depicts an embodiment of a system for apparatus monitoring.

All publications, patents, and patent applications mentioned in this specification are herein incorporated by reference in their entireties for all purposes and to the same extent as if each individual publication, patent, or patent application was specifically and individually indicated to be incorporated by reference. Furthermore, where a range of values is provided, it is understood that each intervening value, between the upper and lower limit of that range and any other stated or intervening value in that stated range is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

DESCRIPTION OF EMBODIMENTS

The following description of the preferred embodiments of the invention is not intended to limit the invention to these preferred embodiments, but rather to enable any person skilled in the art to make and use this invention.

1. Benefits

The inventions associated with the embodiments of systems and methods can confer several benefits over conventional systems and methods, and such inventions are further implemented into many practical applications across various disciplines.

For instance, the inventions described provide a new type of sensor and sensor platform for monitoring equipment having components that rotate, vibrate, and/or operate with electrical current inputs and/or outputs.

The inventions can also provide a new class of edge deployment systems and methods for a platform, where the inventions provide deployment of computing and storage resources at the location where data is produced (e.g., on-chip), for applications of use described. As such, the practical applications of the inventions are extremely valuable to industries described. In embodiments, the invention can omit requirements for displays and/or codecs involved with traditional processing platforms that power various traditional devices, and incorporate use of larger neural processing units (NPUs) and central processing units (CPUs), with coupling to sensor subsystem front end components. As such, the inventions can provide a new class of artificial intelligence systems on chip (AiSoC).

The inventions described also provide a system and platform for signal analysis, which provide improved tools for monitoring, forecasting, and troubleshooting events (e.g., failure modes, lifespans, etc.) of various types of equipment (e.g., mobile equipment, fixed equipment) at global and subcomponent levels. Such inventions prevent unexpected and unplanned maintenance events associated with one or more components which have significant associated costs, thereby improving equipment availability, improving equipment performance and/or allowing equipment to have extended lifespans of use. Such inventions also can return outputs for anticipating future adverse events, such that preventative maintenance measures can be taken.

In specific examples, the invention(s) can be applied to monitoring of rotating equipment with one or more sensor types that sense vibration features of such equipment. Additionally or alternatively, the invention(s) can be applied to monitoring of electrical equipment through sensing of electrical characteristics (e.g., alone or in combination with vibration). Sensor types can include those described below, as well as peripheral sensors (e.g., microphones, strain gages, thermocouples, barometers, speed sensors, etc.), which are described.

The disclosure provides architecture (e.g., algorithms, sensor systems) for analysis of and prediction of failure events for subcomponents and global systems, as well as associated prognostics for repairing such equipment. In examples, such equipment can include rotating equipment and electrical equipment. The algorithms implemented by the system architecture described involve self-attention and masking of time series data from described sensor systems, that define an optimized (e.g., minimum) required set of signals to encode the energy input/flux of the system under observation. Model outputs are then used to affect system behavior and/or guide decisions for repairing equipment in a proactive manner.

2. Systems and Methods

As shown in FIG. 1A, an embodiment of a system 100 for evaluating apparatus events includes: a sensor subsystem 110; a mounting interface 120 between (e.g., coupling) the sensor subsystem 110 and an apparatus 10; a signal conditioning and communications subsystem 130 coupled to the sensor subsystem 110 and configured to receive outputs of the sensor subsystem 110; and a processing subsystem 140 operatively coupled to the signal conditioning and communications subsystem 130, the processing subsystem 140 including non-transitory media storing instructions that, when executed, perform operations for identifying, from outputs of the signal conditioning and communications subsystem 130/sensor subsystem 110, a set of signatures corresponding to states and events of the apparatus 10. The set of signatures are then used by the processing subsystem 140 to execute actions configured to respond to the states/events appropriately, thereby improving performance of the apparatus (e.g., in terms of output, in terms of efficiency, in terms of correcting undesired statuses, in terms of responding to failure modes, etc.). In variations, identification of signatures corresponding to various states of the apparatus 10 can be achieved with neural network model architecture (e.g., attention-based neural network model architecture); however, other variations of the processing subsystem 140 can implement other model architecture. Embodiments of the system 100 can also include a housing 150 configured to protect the sensor subsystem 110 and the signal conditioning and communications subsystem 130.

Figure 1B:
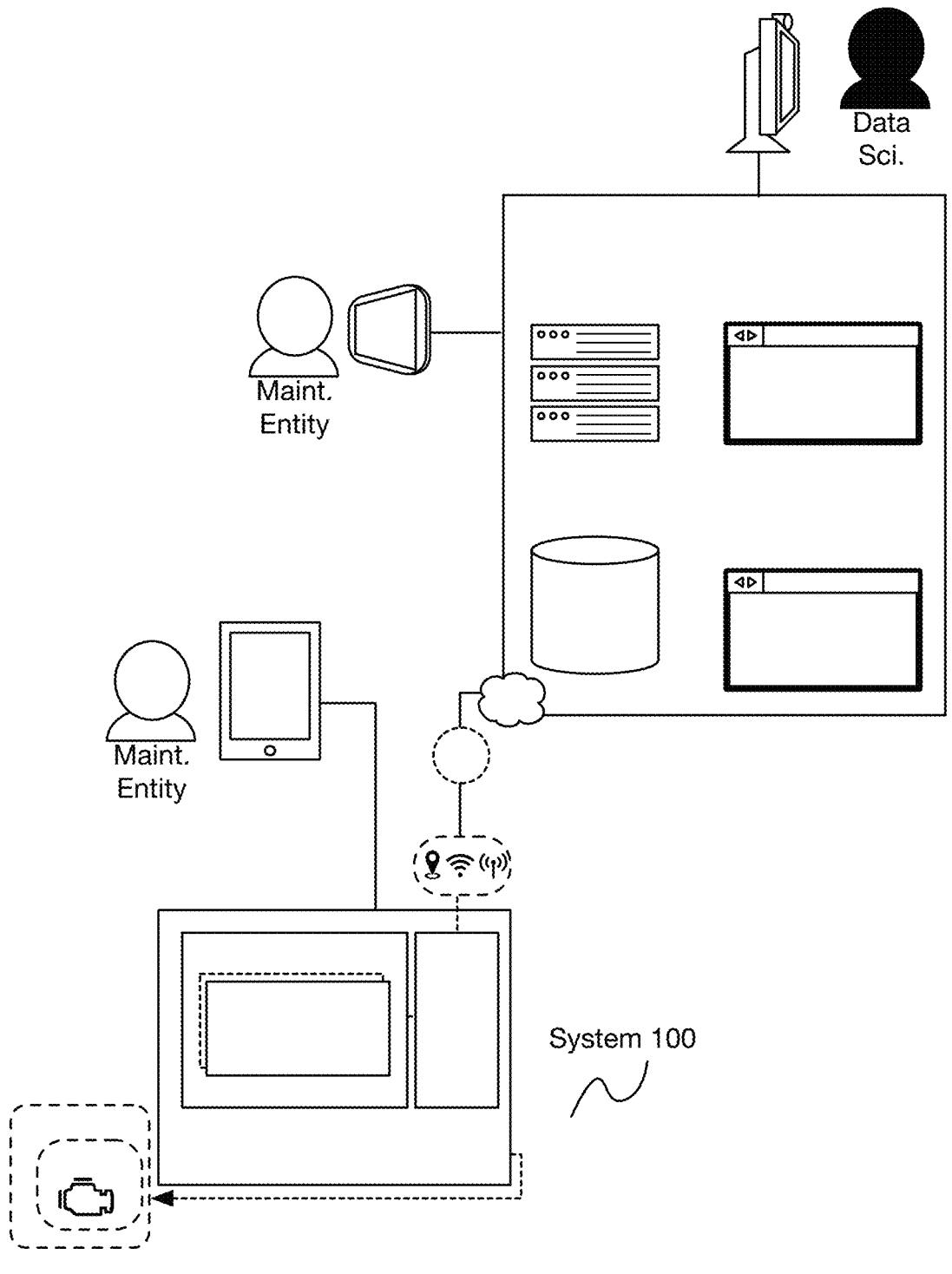
FIG. 1B depicts aspects of an embodiment of a system for apparatus monitoring.

As shown in FIG. 1B, the processing subsystem 140 can include architecture for processing data, generating outputs, storing data, and/or providing interfaces to various entities/users, as described in further detail below.

Figure 1C:
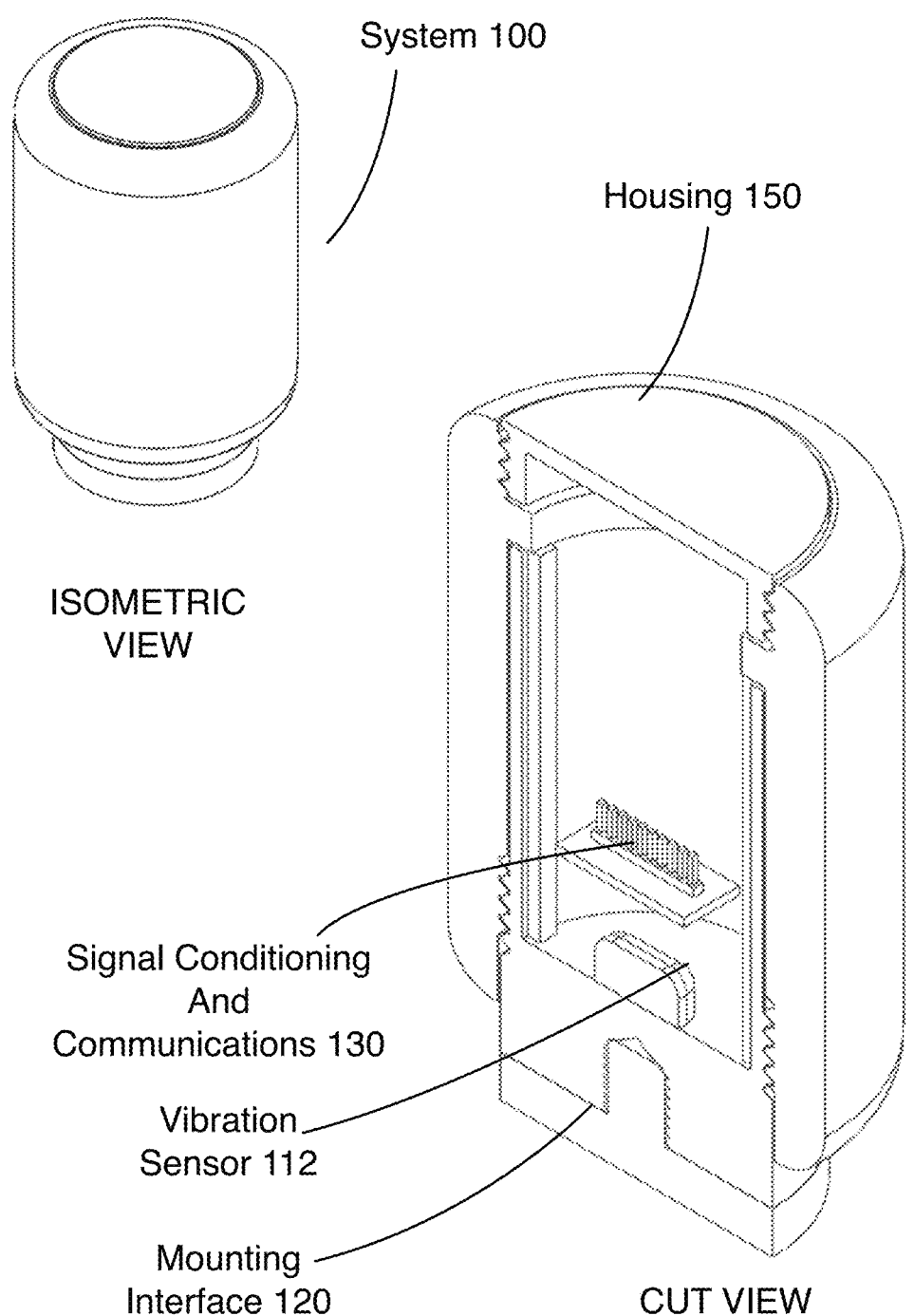
FIG. 1C depicts an example of an embodiment of a system for apparatus monitoring.

FIG. 1C depicts a specific example of the system 100, which is described in more detail below.

The system 100 functions to provide improved tools for monitoring, forecasting, and troubleshooting events (e.g., failure modes, lifespans, etc.) of apparatus components at global and subcomponent levels, with respect to vibration signatures, electrical signal signatures, and/or other signatures. Subcomponents monitored by the system 100 can be positioned near or far from the mounting interface 120, and in examples, can include motor components (e.g., shaft components, fan components, rotor components, bearing components, sheave components, cylinder components, piston components, etc.). Subcomponents can also include associated components, such as contaminants, liquids (e.g., oils, etc.), and/or other components. Exemplary electrical equipment subcomponents include: electric motors, electric actuators, rotors, stators, bearings, complete printed circuit board assemblies (PCBAs) and systems of PCBAs, fuses, passive components (e.g., capacitors, resistors, diodes, etc.), and active components (integrated chips, etc.)

The system 100 can also generate usage information from signals processed, at global and subcomponent levels of abstraction.

Such inventions associated with the system 100 thus prevent unexpected and unplanned maintenance events which have significant associated costs, thereby improving system performance and/or promoting apparatuses to achieve extended lifespans of use. Additionally, the system 100 functions to analyze individual subcomponents of equipment with a single set of sensors coupled to the equipment at a single position, thereby enabling operators to obtain operating life, health, remaining life, and/or other statuses of individual subcomponents in a manner that is significantly more efficient and lower in cost. In particular, the set of sensors can be used to assess apparatus statuses and events upstream and/or downstream of the position of coupling between the sensors and the apparatus, in a manner that has not previously been achieved. Furthermore, the system 100 functions to rapidly process signal streams, with disaggregation of multiple signal types to extract insights related to apparatus statuses and events.

In specific examples, the system 100 provides innovation in advanced sensor system design and machine learning approaches, in fields using systems (e.g., systems with motor components), to provide a plug-and-play, real-time monitoring and predictive maintenance solution in a cost-effective manner. In particular, the system 100 monitors a small number of system parameters and transmits data for processing (e.g., at least in part in cloud computing systems, in coordination between cloud and non-cloud based computing systems) to determine health statuses of the associated apparatuses, at the component level, in real time. Apparatuses statuses and actionable alerts are the provided by the system 100 to the user (e.g., using a customer portal), to enable them to streamline their equipment maintenance procedures and prevent downtime.

In applications, the system 100 can be applied to monitoring, maintenance, and failure prevention of: energy generation systems (e.g., nuclear energy systems, alternative energy systems, renewable energy systems, non-renewable energy systems, etc.), systems of utilities (e.g., electrical utilities, water utilities, gas utilities, etc.) where the apparatus can be an electric utility apparatus, vehicle systems (e.g., electric vehicle systems, gas-powered vehicle systems, fuel cell-powered vehicle systems, etc.) that are terrestrial or non-terrestrial, manned aircraft, unmanned aircraft (e.g., remotely-piloted aircraft), manufacturing systems, fabrication systems, control and safety systems, measurement instrumentation systems, regulator systems, actuator systems, autonomous systems, robotic systems, electrical systems, and/or other systems.

In specific applications, the system 100 provides architecture for monitoring of an apparatus such as an unmanned aerial vehicle (e.g., remotely piloted aircraft), with real-time monitoring and predictive maintenance of such unmanned aircraft with respect to systems globally and subcomponents of systems. Outputs of the system 100 can provide real-time monitoring and predictive maintenance of: flight control surfaces that aerodynamically affect flight of the aircraft relative to a pitch axis (i.e., a transverse axis), a yaw axis (i.e., a vertical axis), and a roll axis (i.e., longitudinal axis) of the aircraft. Flight control surfaces can include one or more of: ailerons, flaps, elevators, stabilizers (e.g., horizontal stabilizers), rudders, spoilers, slats, air brakes, vortex generators, trim surfaces, canards, and any other suitable control surfaces. Outputs of the system 100 can provide real-time monitoring and predictive maintenance of: power plant subcomponents for generation of mechanical power associated with flight operations, and in variations, the power plant can include one or more of: a piston engine (e.g., in-line engine, V-type engine, opposed engine, radial engine, etc.), a gas turbine engine (e.g., turbojet engine, turbofan engine), a pulse jet, a rocket, a Wankel engine, a Diesel engine, an electric engine, a hybrid engine, and any other suitable power plant system. Outputs of the system 100 can provide real-time monitoring and predictive maintenance of: energy sources (e.g., fuel system, battery, solar cell, etc.) and cooling system components (e.g., forced convection cooling system, liquid cooling system, oil cooling system, etc.) for aircraft performance in flight. Outputs of the system 100 can provide real-time monitoring and predictive maintenance of: landing systems (e.g., landing gear systems, skids, floats, etc.). Outputs of the system 100 can provide real-time monitoring and predictive maintenance of: weapons systems involving missile systems and other systems; defense systems; and other systems. Outputs of the system 100 can provide real-time monitoring and predictive maintenance of: surveillance systems (e.g., vision systems, sensor systems of the aircraft related to flight operations, including pressure sensors, temperature sensors, fuel flow sensors, etc.).

In specific applications, the system provides architecture for monitoring of systems and subcomponents of systems of utilities (e.g., electrical infrastructure utilities).

In embodiments, the system 100 can be configured to perform steps of embodiments, variations, and examples of a method 300 described in Section 3 below. However, the system 100 can additionally or alternatively be configured to perform other suitable methods.

Further details of components of the system 100 are described in the following sections.

2.1 System-Sensor(s)

As shown in FIGS. 1A-1C, the system 100 includes a sensor subsystem 110 including a vibration sensor 112. The sensors of the sensor subsystem 110 collectively function to generate signals for monitoring a set (e.g., minimized set, discrete set, etc.) of signal types and/or number of a parameters, from which performance of the apparatus and/or demand on the apparatus can be extracted. The data can then be processed according to methods described in more detail below, in order to efficiently assess statuses of and/or anticipate events of the apparatus to which the system 100 is coupled, and its subcomponents.

The vibration sensor 112 functions to detect and measure vibrations or accelerations sensed through the mounting interface 120 of the system, by covering mechanical motion into electrical signals for processing by the signal conditioning and communications subsystem 130 and/or processing subsystem 140. In embodiments, the vibration sensor 112 includes a sensing component (e.g., mass coupled to a spring element, piezoelectric material, etc.) that generates an electrical charge proportional to the applied force or acceleration. When vibrations occur, the sensing component produces an electrical signal output. The vibration sensor 112 can provide real-time data on vibration levels within the system 100 and/or apparatuses to which the system 100 is coupled, where conditioned and processed outputs of the vibration sensor 112 are fed as inputs into model architecture for returning component and subcomponent statuses, described in further detail below.

In variations, the vibration sensor 112 can be a piezoelectric sensor that uses the piezoelectric effect to generate an electrical charge when subjected to mechanical stress or vibration, for measurement of low frequency and high frequency vibrations in applications of use described herein.

In variations, the vibration sensor 112 can be a microelectromechanical Systems (MEMS) sensor including accelerometer on a chip, where MEMS sensors can provide compactness and low power consumption benefits in applications of use described herein.

In variations, the vibration sensor 112 can be a capacitive sensor that measures vibrations based on changes in capacitance, with resulting electrical signal outputs in response to relative motion of the plates of the capacitive sensor.

In variations, the vibration sensor 112 can be a magnetic sensor (e.g., eddy current sensor) that detects changes in magnetic fields caused by the movement of a conductive target in response to vibrations. A magnetic sensor of the system 100 can be appropriate for applications involving non-contact-based sensing, or for detecting vibrations in apparatuses with direct physical coupling to such apparatuses.

In variations, the vibration sensor 112 can be a strain gauge sensor that measures vibrations indirectly by detecting changes in strain or deformation in a material to which the vibration sensor 112 is coupled. The strain gage sensor can measure electrical resistance changes resulting from deformation of sensor components, enabling vibration measurements.

In variations, the vibration sensor 112 can be a laser Doppler vibrometer that uses laser light to measure vibrations with high precision. The laser Doppler vibrometer can be structured to emit a laser beam onto a vibrating surface of the apparatus and analyze the frequency shift of the reflected light to determine the velocity and displacement of the surface of the apparatus.

The vibration sensor 112 can be a multi-axis sensor or a single-axis sensor. In a specific example, the vibration sensor 112 is a multi-axis accelerometer (e.g., 3-axis accelerometer).

In variations, the vibration sensor 112 can be rated to a maximum acceleration of: 10 G, 20 G, 30 G, 40 G, 50 G, 60 G, 70 G, 80 G, 90 G, 100 G, 200 G, 300 G, 400 G, 500 G, 600 G, 700 G, 800 G, 900 G, 1000 G, 2000 G, 3000 G, 4000 G, 5000 G, an intermediate acceleration, or another acceleration threshold depending upon application of use.

In variations, the sensor subsystem 110 can include a set of vibration sensors, where the set of vibration sensors can include vibration sensors of the same type or different types. For instance, a set of vibration sensors can include a first vibration sensor configured for sensing vibrations having an associated first frequency range (e.g., vibrations below 500 Hz), and a second vibration sensor for sensing vibrations having an associated second frequency range (e.g., vibrations greater than or equal to 500 Hz).

Additionally or alternatively, set of vibration sensors can vibration sensors coupled or configured to sense vibrations from different regions of the apparatus (e.g., by coupling or by non-coupled sensing). In one example, non-coupled sensing can involve magnetic sensors configured to sense motion of components having detectable magnetic fields. In another example, non-coupled sensing can involve sensors configured to transmit light (e.g., laser light) onto different surfaces and detect light from different surfaces of the apparatus. In variations, outputs generated from the set of vibration sensors can be processed for determination of complex signatures and/or signatures aggregated from different sensor types (e.g., such as variations of sensors described above) and sensor positions relative to each other or to apparatus components. Complex signatures can be determined as a function of one or more of: signals from different sensor types, signals associated with different vibration frequencies, signals associated with spectral decompositions of modes of vibration, signals associated with acceleration parameters of vibration, signals associated with velocity parameters of vibration, signals associated with displacement parameters of vibration, signals associated with amplitude of vibration, signals associated with decay rate of vibration, signals associated with cyclic parameters of vibration, and/or other parameters of vibration.

In variations, additional sensors of the sensor subsystem 110 can include one or more ancillary sensors include: microphones, mems triaxial accelerometers, piezoelectric sensors, magnetic flux sensors, and cameras, where outputs of such sensors can be sampled and fed into variations of algorithms described below, in combination with processing of outputs of the vibration sensor 112.

In variations, the weight of the sensor subsystem 110 can be: 0.1 ounce, 0.2 ounce, 0.3 ounce, 0.4 ounce, 0.5 ounce, 0.6 ounce, 0.7 ounce, 0.8 ounce, 0.9 ounce, 1 ounce, 1.1 ounces, 1.2 ounces, 1.3 ounces, 1.4 ounces, 1.5 ounces, 1.6 ounces, 1.7 ounces, 1.8 ounces, 1.9 ounces, 2 ounces, 2.1 ounces, 2.2 ounces, 2.3 ounces, 2.4 ounces, 2.5 ounces, 2.6 ounces, 2.7 ounces, 2.8 ounces, 2.9 ounces, 3 ounces, 4, ounces, 5 ounces, 6 ounces, 7 ounces, 8 ounces, 9 ounces, 10 ounces, 11 ounces, 12 ounces, 13 ounces, 14 ounces, 15 ounces, 16 ounces, an intermediate weight, or another suitable weight, where the weight can be configured to not induce undesired vibrational effects in the system 100 or apparatus (e.g., the weight of the system 100 is significantly smaller than the apparatus).

In variations, the sensor subsystem 110 can include other suitable sensors, including one or more of: a temperature sensor structured to measure temperature at a surface or internal component (e.g., part, fluid) of the apparatus, a flow sensor configured to measure flow characteristics of fluids of the apparatus, a pressure sensor configured to measure pressures within chambers of the apparatus, a demand sensor configured to measure varying demand on the apparatus (e.g., in relation to demand for power output from the apparatus, in relation to motor speed, etc.), a humidity sensor, a light sensor, rotational speed sensors (e.g., for motor shafts), position sensors, force sensors (e.g., related to loads carried by the apparatus and/or applied to the apparatus, ultrasonic sensors, sensors for filter heads of the apparatus, magnetic sensors (e.g., Hall Effect sensors) used to measure motor RPM or other linear/angular position sensors for detection of apparatus motion, and other sensors.

In some embodiments, the sensor subsystem 110 can include material bodies configured to modulate vibration or other stimuli sensed by the sensor subsystem. Such material bodies can function as physical filters for one or more of: optical signals (e.g., interfering optical signals), motion-sourced signals (e.g., interfering signals), temperatures, electrical signals (e.g., interfering electrical signals), magnetic signals (e.g., interfering magnetic signals), sound-sourced signals (e.g., interfering signals from environmental sound sources), and other signals.

In some embodiments, the sensor subsystem 110 can include material bodies configured to operate as resonant or amplifying bodies for enhancing quality of vibration-based signals or other signals sensed by the sensor subsystem. Such material bodies can function to promote resonation or amplification of: optical signals (e.g., interfering optical signals), motion-sourced signals (e.g., interfering signals), temperatures, electrical signals (e.g., interfering electrical signals), magnetic signals (e.g., interfering magnetic signals), sound-sourced signals (e.g., interfering signals from environmental sound sources), and other signals.

The sensor subsystem 110 can additionally or alternatively omit one or more sensor types listed above. For instance, in relation to the processing subsystem 140 described in more detail below and/or implementation of training datasets in Section 3 below, the sensor subsystem 10 can omit sensor types as required, in relation to assessing apparatus subcomponent statuses and/or events with the fewest number of signal types required.

2.2 System-Mounting Interface

As shown in FIGS. 1A-1C, the system 100 includes a mounting interface 120 between the sensor subsystem 110 and the apparatus 10, where the interface 120 functions to provide a mechanism for robust physical coupling of the sensor subsystem 110 to the apparatus, or physical coupling of the sensor subsystem 110 to an object that enables detection of signals associated with the apparatus.

The mounting interface 120 can include a first region that couples to the apparatus (or object) and a second region that couples to the first region, and positions the sensor subsystem 110 appropriately. The mounting interface 120 can be configured to permanently couple the system 100 to the apparatus (e.g., such that the system 100 is not easily moved). Alternatively, the mounting interface 120 can be configured to movably couple the system 100 to the apparatus, such that the system 100 can be re-positioned, if desired. The first region can be physically contiguous with the second region. Alternatively, the first region can couple with the second region by one or more of: a press-fit, a snap fit, a screw-based mechanism, a fastener-based mechanism, a magnetic mechanism, an adhesive, thermal bonding, or another suitable mechanism.

The mounting interface 120 can be configured to couple the system to the apparatus away from the motor of the apparatus 10, such that the mounting interface never directly contacts the source(s) of vibration in the apparatus (e.g., as a non-invasive detection system).

In variations, the mounting interface 120 can couple to the apparatus or object by one or more of: a press-fit, a snap fit, a screw-based mechanism, a magnetic mechanism, an adhesive, thermal bonding, or another suitable mechanism.

In a specific example, the mounting interface 120 can have a custom form factor (e.g., configured to mate or complement a surface of the apparatus or object). However, the mounting interface 120 can alternatively be non-custom.

In order to provide a robust mechanism of coupling with the apparatus 10, the mounting interface 120 can couple with a housing 150 (optional) of the system 100.

The mounting interface 120 and/or housing can be composed of a material having suitable mechanical properties. In variations, materials of the housing 150 and/or other aspects of the mounting interface 120 can be configured to provide suitable mechanical properties in relation to stresses attributed to mechanical forces applied to the system 100 (e.g., radial stresses, shear stresses, longitudinal stresses, tensile stresses, compressive stresses, stresses associated with pressure vessels; stresses associated with impacts to the system 110 and/or the apparatus during use; stresses due to thermal expansion; stresses due to thermal contraction; and other associated stresses depending upon applications of use.

Additionally or alternatively, the housing 150 and/or mounting interface 120 can be composed of a material having suitable thermal properties. In variations, materials of the housing 150 and/or other aspects of the mounting interface 120 can be configured to provide suitable thermal properties in relation to one or more of: thermal conductivity, thermal expansion (e.g., in relation to having a desired level of thermal expansion); and other thermal properties depending upon application of use.

Additionally or alternatively, the housing 150 and/or mounting interface 120 can be composed of a material having suitable physical or surface properties. In variations, materials of the housing 150 and/or mounting interface 120 can be configured to provide suitable physical or surface properties in relation to one or more of: electrochemical properties (e.g., due to corrosive environments), electromagnetic properties (e.g., in relation to ultraviolet light exposure), and other surface or physical properties due to environment of use of the system 100.

The housing 150 can also function to provide a seal about sensitive electronic and other components associated with the sensor subsystem 110 (e.g., such as the monitor 130 described in more detail below). In variations, the seal can be a hermetic seal, a seal that allows passage of gasses but prevents passage of liquids, or another suitable type of seal. In these variations, the housing 150 can function as a seal, or can additionally or alternatively include sealing components (e.g., gaskets, o-rings, sealing compounds, etc.) at openings of the housing 121, or between various subportions of the housing 150.

The housing 150 surrounding the vibration sensor and/or mounting interface 120 can provide an environmental protection rating of IP[0-6][0-9], and in a specific example, the housing 150 and mounting interface 120 provide an environmental rating of IP69K.

In specific examples, the housing 150 can be composed of a metallic material (e.g., aluminum), a metal-derived material, a ceramic material, a natural material, a synthetic material, or another suitable material. In other specific examples, the housing 121 can be composed of a polymeric material having suitable properties.

As described above, the mounting interface can also couple the sensor subsystem 110 to other portions of the apparatus (e.g., in relation to mobile applications, in relation to industrial applications). In particular, the mounting interface 120 can allow coupling of electronics of the system 100 to a vehicle interface for monitoring engine RPM or other operational demand characteristics. In variations, the mounting interface 120 can allow the sensor subsystem 110 to couple to a vehicle interface/CAN bus, with an associated protocol (e.g., J1939 protocol). However, other variations of the mounting interface 120 can allow the sensor subsystem 110 to couple to another type of vehicle interface or other type of apparatus interface, with another suitable protocol.

As noted above, the mounting interface 120 can additionally or alternatively provide "contactless" coupling between the sensor subsystem 110 and portions of the apparatus 10. In variations, the interface 120 can thus include architecture for enabling non-contact sensing between sensors of the sensor subsystem 110 and the apparatus, with architecture for wireless signal transmission between various system components. A variation of non-contact sensing can employ a clamp or other coupler that couples the non-contact sensors to portions of the apparatus.

2.3 System-Signal Conditioning and Communications

As shown in FIGS. 1A-1C, embodiments of the system 100 can include a signal conditioning and communications subsystem 130, which functions to condition acquired signals from the sensor subsystem 110 onboard, and to facilitate wireless/wired communication of signals with the processing subsystem 140. As such, the signal conditioning and communications subsystem 130 can be configured to receive outputs of the sensor subsystem 110 and to transmit data derived from outputs of the sensor subsystem 110 to components of the processing subsystem 140 described in more detail below. In one embodiment, the signal conditioning and communications subsystem 130 is coupled to the vibration sensor within the housing and configured to receive a vibration signal stream from the vibration sensor. The signal conditioning and communications subsystem 130 can include a controller (e.g., an embedded control module) that samples data generated from the sensor subsystem 110, logs the data, and transmits the data (e.g., over a wireless connection, over a wired connection) to the processing subsystem 140 described below.

In variations, the signal conditioning and communications subsystem 130 can be configured to receive analog signals from the sensor subsystem 110. Additionally or alternatively, the signal conditioning and communications subsystem 130 can be configured to receive digital signals (e.g., signals that are digitized from analog signals, etc.) from the sensor subsystem 110. As such, signals from the sensor subsystem 110 can be transmitted to the signal conditioning and communications subsystem 130 as analog signals, or alternatively as digital signals (e.g., digitized from analog signals, etc.), and the signal conditioning and communications subsystem 130 can accordingly process and transmit data derived from the signals to the processing subsystem 140.

In a variations, the signal conditioning and communications subsystem 130 can include computer architecture and circuitry for one or more of: connectors between various sensor and components of the signal conditioning and communications subsystem 130 (e.g., in relation to sensor inputs), data storage, power source (e.g., battery, other power source), power management, and data transmission (e.g., via wireless communications, via wired communications, etc.). The signal conditioning and communications subsystem 130 can additionally or alternatively include architecture and circuitry for preconditioning of signals and/or data derived from the sensor subsystem 110 and/or other suitable functions. A specific example of the signal conditioning and communications subsystem 130 is described in Section 2.3.1 below.

2.3.1 Signal Conditioning and Communications-Specific Example

In a specific example, the signal conditioning and communications subsystem 130 includes an embedded controller comprising a computer comprising circuitry for interfacing with the sensor subsystem 110, with peripherals for debugging and wireless communication. In the specific example, the computer is an embedded single board computer of the signal conditioning and communications subsystem 130 that implements a Xilinx K26 Kria™ system-on-module (SOM) structured for edge computer vision applications, with artificial intelligence (AI) performance attributed to Zynq MPSoC architecture and architecture configured with various deep learning processing unit (DPU) or neural processing unit (NPU) configurations. Various DPU/NPU configurations (e.g., at 300 Hz) of the signal conditioning and communications subsystem 130 can provide performance of the following, in trillions of operations per second (TOPS): 0.5 TOPS, 0.6 TOPS, 0.7 TOPS, 0.8 TOPS, 0.9 TOPS, 1 TOPS, 1.1 TOPS, 1.2 TOPS, 1.3 TOPS, 1.4 TOPS, 1.5 TOPS, 2 TOPS, 3 TOPS, 4 TOPS, or greater, thereby achieving unprecedented performance with respect to computing operations involving machine learning architecture for such novel sensor configurations for monitoring apparatus.

The signal conditioning and communications subsystem 130 (e.g., Kria K26 SOM) supports a full range of data type precisions such as FP32, INT8, binary, and other custom data types, and operations on lower precision data type can consume low power (e.g., less than 0.03 picojoules, less than 0.05 picojoules, less than 1 picojoule, less than 10 picojoules, less than 50 picojoules, or up to 700 picojoules, depending upon operation).

In a specific example, the signal conditioning and communications subsystem 130, with processing subsystem 140 described below, includes an NPU is an NPU with 1 trillions of operations per second (TOPS) capability with energy use performance of less than 1 picojoule per operation. The NPU can include self-attention time-series transformer architecture comprising an encoder block comprising multi-head attention subarchitecture, described in more detail below. The self-attention time-series transformer architecture of the NPU can omit a decoder block, as described in more detail below. The NPU can be on-chip, for edge deployment applications described.

In the specific example, the signal conditioning and communications subsystem 130 can include the following features: Application processor of Quad-core Arm® Cortex®-A53 MPCore™ up to 1.5 GHz; real-time processors of Dual-core Arm Cortex-R5F MPCore up to 600 MHz; general processing units (GPUs); camera interfaces; display interfaces; video encode architecture; video decode architecture; wireless architecture (CTR M.2/SATA) along with WiFi, LTE, and GPS architecture (e.g., Ublox NINA WiFI and Ublox SARA LTE); ethernet architecture; a sampling rate of up to or over 1 MHz per channel; and other features.

The signal conditioning and communications subsystem 130 can be programmed and deployed using a suitable development environment.

In relation to sensor inputs from the sensor subsystem 110 and other inputs to the signal conditioning and communications subsystem 130, the signal conditioning and communications subsystem 130 of the specific example is configured to receive inputs associated with the vibration sensor 112, digital inputs, and auxiliary inputs. The signal conditioning and communications subsystem 130 of the specific example includes a CAN transceiver and routes the CAN interface to the computer (e.g., using suitable connectors).

In the specific example, the signal conditioning and communications subsystem 130 can also include high speed industrial digital inputs. The industrial digital inputs can be used to monitor other inputs. The industrial digital input can also be used to monitor a frequency input associated with demand on the apparatus 10. These and other inputs are intended to be used for monitoring, in order to automate machine algorithm training, as described in more detail in relation to the processing subsystem 140 and associated methods below.

In the specific example, the signal conditioning and communications subsystem 130 includes a high density connector with dedicated inputs/outputs (I/O) for system peripherals and power supply couplings. The signal conditioning and communications subsystem 130 also includes a programming interface (e.g., USB interface) to program the computer and/or enable development functionality. The computer of the signal conditioning and communications subsystem 130 also includes a USB-to-Ethernet converter so the interface appears as an Ethernet network adapter with constant IP address on a separate host computer. The signal conditioning and communications subsystem 130 also includes a data storage module (e.g., uSD card connector for increased data storage). The controller of the signal conditioning and communications subsystem 130 uses the data storage module to log time series sensor data. The signal conditioning and communications subsystem 130 also includes an onboard battery to power the real time clock of the computer. The battery is also used for the global navigation satellite system (GNSS) module to improve signal lock time for tracking and navigation purposes in mobile applications of the system 100.

In the specific example, the signal conditioning and communications subsystem 130 also includes a power management module that receives an input voltage (e.g., 9-36V DC input voltage) and conditions the input voltage to provide necessary voltages for other architecture of the signal conditioning and communications subsystem 130. In relation to mobile applications of use, the monitor includes circuitry to condition the input voltage to deal with over voltage scenarios, under voltage scenarios, reverse polarity protection, and transients that are common in mobile (e.g., manufacturing, energy management, automotive, terrestrial, other mobile) applications. In more detail, in mobile applications, the controller is powered from the apparatus battery bank. To avoid draining the apparatus battery while the apparatus is in an off or idle state, the power management module includes a power latching relay to remove power, if needed. In specific scenarios when the signal conditioning and communications subsystem 130 needs to remain powered on, the power management module implements a smart battery management system (SBMS) in the connection junction module. The SBMS charges while the apparatus is on and powers the control module when the vehicle is off. The SBMS communicates with the controller of the signal conditioning and communications subsystem 130 via CAN bus protocol to provide battery status. In order to maximize battery life, the controller of the monitor 130 goes into low power mode and periodically wakes up to monitor GPS location and transmit location and status to the host server.

In relation to data communication, the specific example of the signal conditioning and communications subsystem 130 achieves wireless communication using dedicated WiFi and cellular modems that interface to the computer. In the specific example, the radio antennas of the wireless communication components are external to the signal conditioning and communications subsystem 130 and couple to the signal conditioning and communications subsystem 130 (e.g., by a 50 Ohm SMA connector). The signal conditioning and communications subsystem 130 also includes a dedicated GNSS module for monitoring position data by global satellite. The GNSS module interfaces to the computer. In the specific example, the active GPS antenna is external to the signal conditioning and communications subsystem 130 and couples to the signal conditioning and communications subsystem 130 (e.g., by a 50 Ohm SMA connector).

2.4 System-Processing Components

As shown in FIGS. 1A-1C, the system includes a processing subsystem 140 operatively coupled to the signal processing and communications subsystem 130 and/or sensor subsystem 110 and including non-transitory computer-readable media storing instructions that, when executed (e.g., by one or more controllers in communication with the processing subsystem 140), perform operations for identifying, from outputs of the signal processing and communications subsystem 130 and/or processing subsystem 140, a set of unique signatures corresponding to states and events of the apparatus 10. The processing subsystem 140 thus functions to generate analyses (e.g., related to apparatus and subcomponent statuses and events) derived from signals, such as vibration and electrical signals, of the sensor subsystem 110, and to facilitate execution of response actions to improve or maintain the apparatus 10. In relation to generation of analyses, the processing subsystem 140 can also function to generate and process training and test datasets for development and refinement of models (e.g., neural network models involving machine learning), where the models return outputs associated with apparatus and subcomponent statuses and events from received sensor data.

The processing subsystem 140 can include one or more processing subsystems implemented in one or more of: a chip (e.g., a chip coupled to or co-located with the sensor subsystem 110 within housing 150), a remote server, a personal computer, a cloud-based computing system (e.g., Zeek™ platform, Amazon™ Web Services (AWS) platform, etc.), a computing module of a mobile electronic device (e.g., mobile communication device, wearable computing device, etc.), and any other suitable computing device. The processing subsystem 140 can communicate with other system components (e.g., signal conditioning and communications subsystem 130) and/or third party systems over a network 160, in relation to data transfer or other operations (e.g., some of which are described above). Furthermore, architecture of the processing subsystem 140 can overlap with that of the signal conditioning and communications subsystem 130 (e.g., on-chip), and/or be physically distinct from that of the signal conditioning and communications subsystem 130. For instance, in one variation, some components of the processing subsystem 140 can be on-board the signal conditioning and communications subsystem 130, and/or some components of the processing subsystem 140 can be distinct and implemented in the cloud and/or computing systems remote from the signal conditioning and communications subsystem 130. In an example, the processing subsystem includes an embedded processor (e.g., single or multi core processor with or without dedicated vector math accelerators).

In more detail, the network 160 functions to enable data transmission between system components and/or third party platforms. The network 160 can include a combination of one or more of local area networks and wide area networks, and/or can include wired and/or wireless connections to the network 160. The network 160 can implement communication linking technologies including one or more of: 802.11 architecture (e.g., Wi-Fi, etc.), 3G architecture, 4G architecture, 5G architecture, Ethernet, worldwide interoperability for microwave access (WiMAX), long term evolution (LTE) architecture, code division multiple access (CDMA) systems, digital subscriber line (DSL) architecture, and any other suitable technologies for data transmission.

In variations, the network 160 can be configured for implementation of networking protocols and/or formats including one or more of: hypertext transport protocol (HTTP), multiprotocol label switching (MPLS), transmission control protocol/Internet protocol (TCP/IP), file transfer protocol (FTP), simple mail transfer protocol (SMTP), hypertext markup language (HTML), extensive markup language (XML), and any other suitable protocol/format. The network 160 can also be configured for and/or provide, through communication links, encryption protocols for improving security of data transmitted over the network 160, with suitable security protocols (e.g., transport layer security (TLS), etc.).

As noted above, the processing subsystem 140 is configured to perform operations for identifying, from outputs of the signal processing and communications subsystem 130, a set of unique signatures corresponding to states and events of the apparatus 10. In variations, the operations can involve processes associated with one or more of: receiving a set of data streams, derived from outputs of the sensor subsystem 110, from the signal processing and communications subsystem 130; performing a set of transformation operations upon the set of data streams, with processing by one or more layers of model architecture; identifying a set of unique signatures corresponding to states and events of the apparatus 10 and subcomponents of the apparatus 10, from the set of transformation operations; returning an analysis including a recommended action for improving or maintaining proper performance of the apparatus 10, based upon the set of signatures; and optionally, executing the recommended action.

In one embodiment, the processing subsystem 140 stores instructions for operations including: receiving vibration data derived from the vibration signal stream; performing a set of transformation operations upon said vibration data; identifying a set of unique signatures corresponding to states of a set of subcomponents of the apparatus, from the set of transformation operations; and returning an analysis comprising a recommended action for improving or maintaining proper performance of the apparatus, based upon the set of unique signatures.

As described in more detail below, the set of unique signatures includes signatures associated with a set of harmonic faults of the apparatus, a set of synchronous faults of the apparatus, a set of sub-harmonic and sub-synchronous faults of the apparatus, and a set of non-synchronous faults of the apparatus, with respect to various fault group types.

One or more operations executed in coordination with the processing subsystem 140 can implement ML models (e.g., neural network models) refined with training data generated by the system 100 and/or other systems, as described in relation to the method 300 below. Exemplary model architecture implemented by the processing subsystem 140 can include attention-based neural network architecture, which enhances the performance of various machine learning tasks by leveraging the concept of attention, inspired by human cognition, to enable the network to selectively focus on/enhance relevant parts of the input data while suppressing irrelevant information. As such, the implemented model architecture can improve computing performance in terms of total energy usage, time taken per task, and other performance aspects described, for various task types described. The attention-based neural network architecture includes multiple components, such as encoder and decoder layers, that work together to capture meaningful relationships between input elements. The attention mechanism allows the network to assign varying degrees of importance to different input elements based on their relevance to the task at hand, facilitating more effective information processing and learning, with dynamic attendance to crucial features. In particular, at each step or stage of the encoder/decoder architecture, inputs are processed with application of an attention mechanism (e.g., higher focus with increased weighting, or suppression of less relevant components) and feeding into the subsequent layer. The architecture can be feed-forward, or of another suitable format.

Details of the operations are further described in relation to embodiments, variations, and examples of the method 300 of Section 3 below.

In examples, returned outputs can indicate statuses of mechanical systems including rotating shafts, bearings, blades (e.g., turbine blades), gears, and other physical systems of apparatuses described. Sources of vibration in such systems can create measureable response amplitudes, repeating rates of occurrence (or frequency response), and induce overall structural motions (e.g., phase responses), which can be detected using sensor subsystem 110 and signal processing and communications subsystem 130. and used by the processing subsystem 140 (e.g., on chip) to return outputs indicating statuses (e.g., fault statuses) of subcomponents. Amplitude components can be processed by model architecture to return statuses involving measurements that may be "out-of-family" with groups of similar apparatus "types" or "classes". Frequency components can be processed with fast Fourier transform (FFT) methods to return spectrum components and provide patterns that can be related to the design or function of the apparatus. Sets of frequency-based features returned by model architecture can indicate normal operation or the onset of mechanical faults or defects.

Returned outputs produced by trained model architecture can include one or more of a set of outputs related to:

Synchronous group fault statuses: Synchronic group fault status outputs indicate faults that generate a predominant 1× revolutions per minute (RPM) or other revolutionary rate response in a frequency spectrum generated from signals, and hold the predominant 1×RPM response (e.g., with presence of one or more additional harmonics in the frequency spectrum) or transition to another RPM response as represented in the frequency spectrum. Exemplary outputs in the synchronous group fault status group include: an unbalance output (e.g., metric that describes level of imbalance), an eccentricity output (e.g., metric that describes level of eccentricity in a system), a mechanical looseness (of various types) output, a gear tooth faults output, a misalignment output (e.g., in a belt drive), and/or other synchronous group outputs. Exemplary outputs can indicate severity of the fault related to apparatus or subcomponent health.

Harmonic group fault statuses: Harmonic group fault status outputs relate predominantly to harmonics or integer multiples of the 1×RPM rotating speed, such as 1 harmonic of the fundamental frequency, up to 5 harmonics of the fundamental frequency, up to 10 harmonics of the fundamental frequency, up to 15 harmonics of the fundamental frequency, up to 20 harmonics of the fundamental frequency, up to 25 harmonics of the fundamental frequency, etc. Exemplary outputs in the harmonic group fault status group include indications of: a coupling misalignment output (offset and angular), a bent rotor output, a bowed rotor output, a cocked rolling element bearing output, a gear meshing harmonic output, a blade passing output, a rotor bar passing output, a mechanical Looseness (e.g., types B and C) output and/or other harmonic group fault status outputs. Exemplary outputs can indicate severity of the fault related to apparatus or subcomponent health.

Sub-Harmonic/Sub-Synchronous group fault statuses: Sub-Harmonic/Sub-Synchronous group fault status outputs relate predominantly to frequency features below the 1×RPM rotating speed, or the fundamental order of the fault. The fault can be an integer fraction of the 1×RPM, or non-synchronous with respect to 1×RPM. Exemplary outputs in the sub-harmonic/sub-synchronous group fault The group include indications of: mechanical Looseness (e.g., Type B and C), rotor/stator rub event status outputs, belt drive frequency outputs, gear tooth repeat problem outputs (e.g., related to assembly phase and hunting tooth), oil whirl and oil whip instability outputs, flow turbulence outputs, cavitation problem outputs, electrical pole passing frequency outputs, rolling element bearing cage frequency outputs, and/or other sub-harmonic/sub-synchronous group outputs. Exemplary outputs can indicate severity of the fault related to apparatus or subcomponent health.

Non-synchronous group fault statuses: Non-synchronous group fault statuses include faults attributed to fault frequencies that are not a multiple or whole fraction of the fundamental rotor speed or a function of the fundamental rotor speed. All of the sub-synchronous faults in this category are also non-synchronous faults. These fault frequencies are created from geometric quantities in component designs, and exemplary outputs include: bearing geometry outputs, belt diameter outputs, piping geometry outputs, cage element geometry outputs, raceway element geometry outputs, other outputs related to morphologies (e.g., clearances between components, eccentricities, etc.), AC and DC motor electrical fault outputs, natural frequency fault series outputs, electro-erosion fault outputs, and other outputs. Exemplary outputs can indicate severity of the fault related to apparatus or subcomponent health.

Modulation group fault statuses: Modulation group fault statuses include faults that are distinguished by side frequency bands (e.g., frequency bands to the sides of fundamental frequencies) of the frequency spectrum, and are associated with later stage failures of the apparatus. Exemplary outputs include: electro-erosion associated outputs in rolling element bearings (e.g., which generate peaks related to defect frequencies of the bearing), barring fault outputs, and other outputs. Exemplary outputs can indicate severity of the fault related to apparatus or subcomponent health.

Multiple indication group fault statuses: Outputs in this category are described by multiple types of faults. Modulation in the vibration signature can have a severity associated with the number of side frequency band sets identified in the frequency spectrum from the sensor subsystem, or the amount of amplitude pulsation noted in time series data. One or both features (e.g., side band features, amplitude pulsations) can provide indications of deterioration included in the fault over time. Exemplary outputs can thus indicate severity of the fault related to apparatus or subcomponent health.

Radial response group fault statuses: In horizontally mounted machines, the mechanical looseness (e.g., type A and type B signatures) typically induce responses only in a vertical direction (e.g., transverse to the defining plane of mounting). Rolling element bearing faults are typically detected in the vertical measurement direction in the vicinity of the bearing load zone. Other faults in this group can be detected in either vertical or horizontal (radial) directions. Exemplary outputs can indicate severity of the fault related to apparatus or subcomponent health.

Axial response group fault statuses: The axial response directional fault group includes eight primarily axial faults that can be predominantly axial based on design (e.g., as in gears) or by fault severity (e.g., bent shaft and overhung rotor unbalance).

Figure 2:
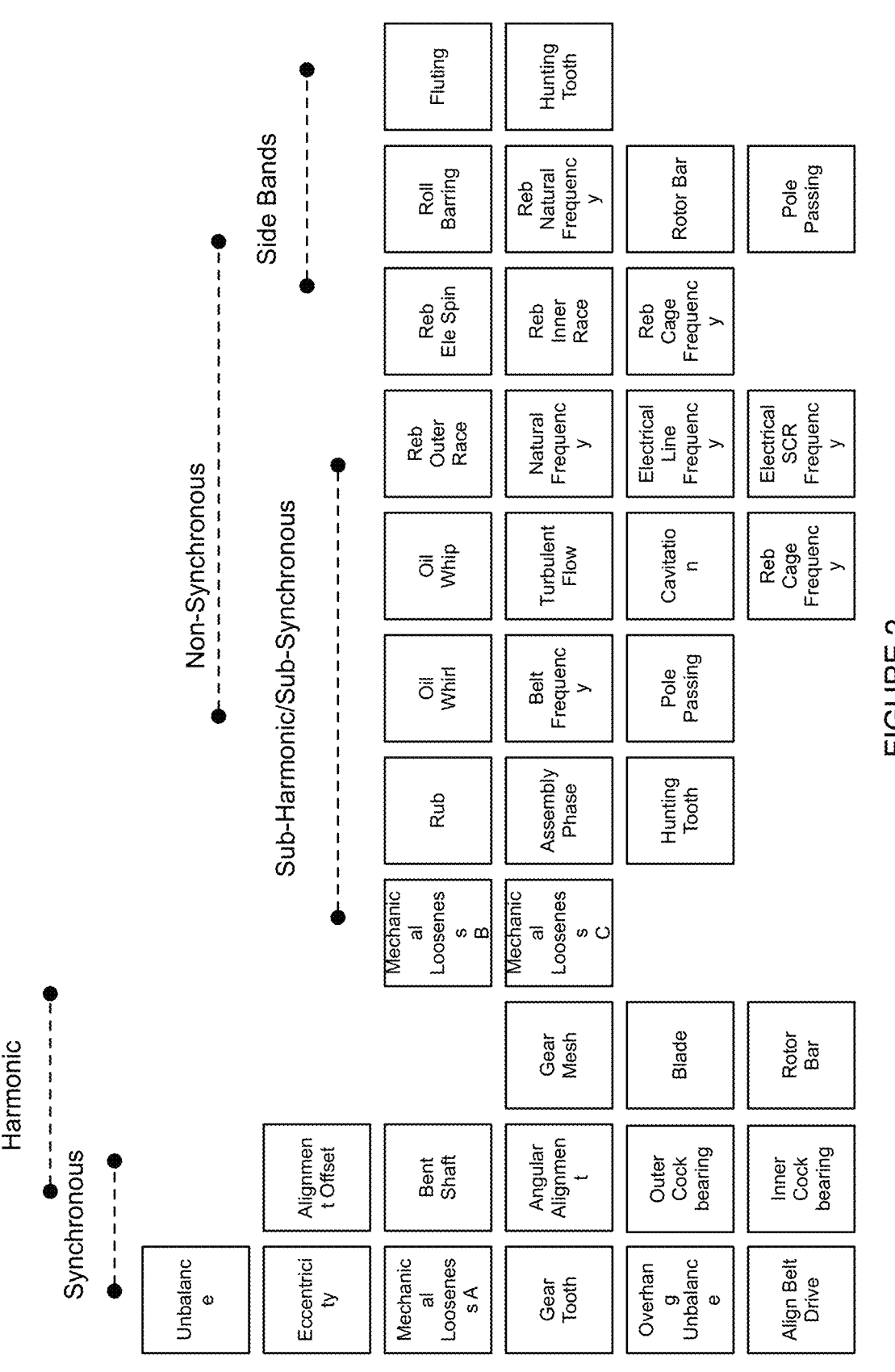
FIG. 2 depicts an embodiment of a vibration fault groupings associated with apparatus monitoring and addressing of indications.

Exemplary faults are shown in FIG. 2 (modified from Daniel T. Ambre, Full Spectrum Diagnostics, PLLC. "THE VIBRATION ANALYSIS PERIODIC TABLE" 2013).

Outputs can be determined upon extracting signatures of signals using model architecture, where model architecture can include operations for performing phase analyses used to distinguish faults with identical frequency response signatures; time waveform analyses used to analyze gear tooth fault problems, looseness, alignment problems, rub events, and beat frequency problems; orbit analyses for analyzing signatures from fluid film bearings related to instabilities and loading issues; ultrasonic spectrum analyses used to detect early rolling element bearing fatigue and lubrication problems; impact natural frequency testing defining structural natural frequencies, resonance margin, damping, and mode shapes of signatures.

3. Method

As shown in FIG. 3, an embodiment of a method 300 for evaluating apparatus events includes: providing a mounting interface between a vibration sensor coupled to a signal processing subsystem, and the apparatus (e.g., without direct contact between the vibration sensor and a motor of the apparatus) S310; sampling a vibration signal stream generated from the vibration sensor during operation of the apparatus S315; performing a set of transformation operations upon the vibration signal stream S320, wherein the set of transformation operations comprises operations applied by self-attention time-series transformer architecture; identifying a set of unique signatures corresponding to faults of a set of subcomponents of the apparatus from the set of transformation operations S330; returning an analysis comprising a recommended action for improving or maintaining proper performance of the apparatus, based upon the set of unique signatures S340; and optionally, executing the recommended action S350.

The method 300 functions to provide improved tools for monitoring, forecasting, and troubleshooting events (e.g., failure modes, lifespans, etc.) of apparatus components at global and subcomponent levels. Exemplary applications of use are described in Sections above.

Such inventions associated with the method 300 thus prevent unexpected and unplanned maintenance events which have significant associated costs, thereby improving system performance and/or allow systems to have extended lifespans of use. Additionally, the method 300 can provide steps for analyzing individual subcomponents of equipment with a single sensor or sensor cluster coupled to the apparatus at a single position, thereby providing operators with information pertaining to operating life, health, remaining life, and/or other statuses of individual subcomponents in a manner that is significantly more efficient and lower in cost. In particular, signals generated by the set of sensors can be used to assess statuses and events upstream and/or downstream of the position of coupling between the sensors and the apparatus in a manner that has not previously been achieved.

In embodiments, the method 300 can be implemented, at least in part, by system 100 elements described in Section 2 above. However, the method 300 can additionally or alternatively be implemented by other suitable systems/system components.

Further details of components of the method 300 are described in the following sections.

3.1 Method-Signal Acquisition

As shown in FIG. 3, Block S310 recites: receiving a set of data streams, derived from outputs of a sensor subsystem. Block S310 functions to monitor a discrete (e.g., minimized) set of signal types and/or number of a parameters, from which performance of the apparatus and/or demand on the apparatus can be extracted. The data derived from the signals can then be processed according to methods described in more detail below, in order to efficiently assess statuses of and/or anticipate events of the apparatus and its subcomponents.

As described in relation to the system above, Block S310 can include establishing an interface between the set of sensors and the apparatus (e.g., as described above). As such, the set of data streams can correspond to sensors of the set of sensors described above, wherein, in embodiments, the set of sensors can include: a vibration sensor and associated signal conditioning and communications architecture. S310 can include providing a mounting interface between a vibration sensor coupled to a signal processing subsystem, and the apparatus, without direct contact between the vibration sensor and a motor of the apparatus; and sampling a vibration signal stream generated from the vibration sensor during operation of the apparatus S315.

The set of data streams can, however, correspond to other signal types and/or signals of the same type, but from sensors not described above.

In relation to receiving the set of data streams, one or more of an embodiment of the monitor and the processing subsystem described above can receive the set of data streams over a wireless or wired connection, using any suitable transmission protocol.

Variations of signal streams can, however, include data outputs having units other than those depicted in the FIGURES, and/or can include derivative parameters or parameters correlating with those described and depicted.

3.2 Method-Extracting Signatures Associated With Statuses and/or Events

Block S320 recites: performing a set of transformation operations upon the set of data streams. The set of transformation operations function to receive, as inputs, the data streams of Block S310 in order enable extraction of signatures corresponding to events (e.g., historical events, anticipated events, usage, etc.) and/or statuses (e.g., health statuses) of the apparatus (e.g., at global and subcomponent levels) in Block S330, in relation to various faults described. As such, processing the inputs in S320 allows for returning of outputs related to various faults in Block S330, with generation of analyses in Block S340 below. The set of transformation operations can additionally or alternatively function to condition, clean, or otherwise generate derivative data types or objects to facilitate performance of subsequent method steps.

In relation to performing the set of transformation operations, an embodiment of the processing subsystem described above can receive the set of data streams of Block S310 over a wireless or wired connection, using any suitable transmission protocol. Receiving the set of data streams and performing the set of transformation operations can be performed real-time (e.g., with information transfer without significant delay from the time of initial signal generation, thereby enabling rapid responses). Additionally or alternatively, receiving the set of data streams and performing the set of transformation operations can be performed non-real time (e.g., with post-processing delay).

As noted above, the set of transformation operations can include layers of self-attention time-series transformer architecture that applies a modified self-attention transformer based architecture capable of processing multivariate time series data to encode vibrational data in an unsupervised fashion. In doing so, the measured vibration of a piece of rotating equipment is embedded into a latent space representation of the temporal dynamics of the system. The latent space embedding is then used to classify vibrational failure modes. In embodiments, the processing subsystem described above can run a single neural network or a series of neural networks trained to identify and classify apparatus events (e.g., historical events, anticipated events, etc.), subcomponent and global statuses, and any variations. As such, the set of transformation operations can take, as inputs, data derived from the signal streams and process them with trained artificial intelligence/neural network models for returning unique signatures in Block S330.

More detail regarding data, features, and training of models is described in 3.2.1 below.

The set of transformation operations can additionally or alternatively include operations associated with signal conditioning, noise removal, artifact mitigation, calibration, or other signal processing operations. Such operations can ensure signal stream quality prior to further processing in various method steps. In some variations, preprocessing the signal streams can include performing one or more steps to verify completeness of data (e.g., no lapse in the signal streams).

In relation to other transformation operations (e.g., after performance of a preprocessing operation), Block S320 can include one or more of: denoising, filtering, smoothing, clipping, transformation of discrete data points to continuous functions, and performing any other suitable data conditioning process. For instance, some variations of Block S320 can additionally include performing a windowing operation and/or performing a signal cleaning operation. In more detail, windowing can include any one or more of moving windows, exponentially weighted moving windows (EWMW), moving Gaussian methods, and any other suitable window filtering method.

In more detail, signal cleaning can include removal of signal anomalies by one or more filtering techniques. In specific examples, filtering can include one or more of:

Kalman filtering techniques, bootstrap filtering techniques, particle filtering techniques, Markov Chain Monte Carlo filtering techniques; metropolis-Hasting methods; approximations (e.g., Laplace approximations); and/or other signal processing approaches. Signal cleaning can thus improve data quality for further processing, in relation to one or more of: noise, sensor equilibration, sensor drift, environmental effects (e.g., moisture, physical disturbance, etc.), and any other suitable type of signal artifact.

Transformation of discrete data points into a continuous function, can include performing an interpolation operation including one or more of: a spline (e.g., a b-spline interpolation), a Bessel function interpolation, a path integral operation (e.g., a Feynman-Kac path integral operation), and any other suitable interpolation operation. The interpolation operation can thus support a wavelet approximation operation, which requires a continuous function. The wavelet approximation operation can functions to provide further smoothing and detrending of data from the sensor subsystem without distorting the underlying signal or introducing a time lag component. In variations, the wavelet basis functions can include any one or more of: Daubechies wavelets, Dual-Tree Complex wavelets, Haar wavelets, Newland wavelets, and any other suitable wavelet basis function(s). Furthermore, in variations, the wavelet analysis can implement a continuous wavelet transform that can construct a time-frequency representation of a signal.

Block S320 can additionally or alternatively include any other suitable signal processing operation.

Block S330 recites: identifying a set of unique signatures corresponding to states and events of the apparatus and subcomponents of the apparatus, from the set of transformation operations, which functions to process input data streams and/or derivative data, in order to properly return accurate outputs associated with vibration fault events, severity, and statuses of the apparatus. Block S330 can thus execute steps for unique signature identification associated with apparatus subcomponents, faults, and severity of faults, through event detection and attention-based neural network architecture described.

3.2.1 Method-Signal Processing and Machine Learning Approaches

In relation to identification of unique signatures corresponding to events and/or statuses of the apparatus, the processing subsystem described above can implement architecture for classification (e.g., of failure modes and faults), with training of models by processing suitable training datasets. In particular, the unique characteristics of each event and status of the apparatus are not practically detectable in the mind, and are instead learned by the machine learning architecture in relation to Blocks S320-S340 of the method 300.

As introduced above, exemplary model architecture(s) used to process inputs and to generate faults, failure modes, and predictions of other statuses of the apparatus include the following:

Self-attention time-series transformer architecture with masking: Such architecture applies a modified self-attention transformer-based architecture capable of processing multivariate time series data, in order to encode vibrational data of the sensor subsystem in an unsupervised fashion. In doing so, the measured vibration of a component of the vibrating apparatus or subcomponent thereof is embedded into a latent space representation of the temporal dynamics of the system. The latent space embedding is then used to classify vibrational failure modes.

In more detail, the model applies a modified self-attention transformer based architecture capable of processing multivariate time series data to encode vibrational data in an unsupervised fashion. The modified transformer encoder takes as input training samples, $X \in R^{w \times m}$, which are multivariate time series of length w and m different variables. The training samples (e.g., training dataset) can be acquired from the sensor subsystem 110, where the training samples include data streams associated with acquired vibration signals, with labels corresponding to known faults, failure modes, and statuses of the apparatus at global and subcomponent levels. To generate the training dataset(s), apparatuses and subcomponents with undiagnosed/unlabeled faults, failure modes, and statuses can be operated, and sensor signals can acquired to generate the training dataset, with subsequent verification of classified statuses, with unsupervised multistage training. Alternatively, to generate the training dataset(s), apparatuses and subcomponents with diagnosed faults, failure modes, and statuses can be operated, and sensor signals acquired to generate the training dataset(s).

The original feature vectors $x_t$ are first normalized by subtracting the mean and divide by the variance across the samples of the training dataset. The normalized inputs are then linearly projected with bias onto a d-dimensional vector space, where d is the dimension of the transformer model sequence element representations: $u_t = W_p x_t + b_p$, where $W_p \in R^{d \times m}$ and $b_p \in R^d$ are fully learnable parameters and $u_t \in R^d$, $t = 0, \ldots, w$ inputs to the transformer encoder. These inputs, which were transformed from the training dataset, become the queries, keys and values feeding into the self-attention layer, after adding the positional encodings corresponding to time, $t_w$. The multi-headed attention mechanism is altered by changing the normalizations from layer based to batch based, which allows for better handling of outlier signal data, and utilizing a Gaussian error linear unit (GELU) instead of a rectified linear unit (ReLU).

In a standard transformer which employs an encoder-decoder framework, the result of the transformer encoder block is sent along with the target shifted output sequence to the decoder block in a supervised fashion.

Embodiments of the model architecture can implement an alternative approach, with inclusion of architecture for seeking unbiased embedding of the vibrational state of a piece of equipment. The decoder block can be omitted, and instead a single linear layer is used to predict the normalized input values. The degree to which these predicted system values recapitulate the source data allows the model to learn interdependencies between the monitored variables of the system, embed these relationships into a high dimensional state, and predict the state of the apparatus or subcomponents from sparse input data, in a manner that produces a higher level of efficiency with respect to computations performance and energy usage.

The multivariate time-series encoder can be trained in two stages, as indicated above. First, an unsupervised pre-training is performed to autoregress unlabeled time-series data of the training dataset. The goal of the unsupervised training is to encode an input spectrum into a meaningful latent space. The resulting embedding allows both the original spectra to be decoded directly from the latent space representation but also facilitates downstream application for classification and forecasting of vibrational failure modes in rotating equipment.

Figure 4:
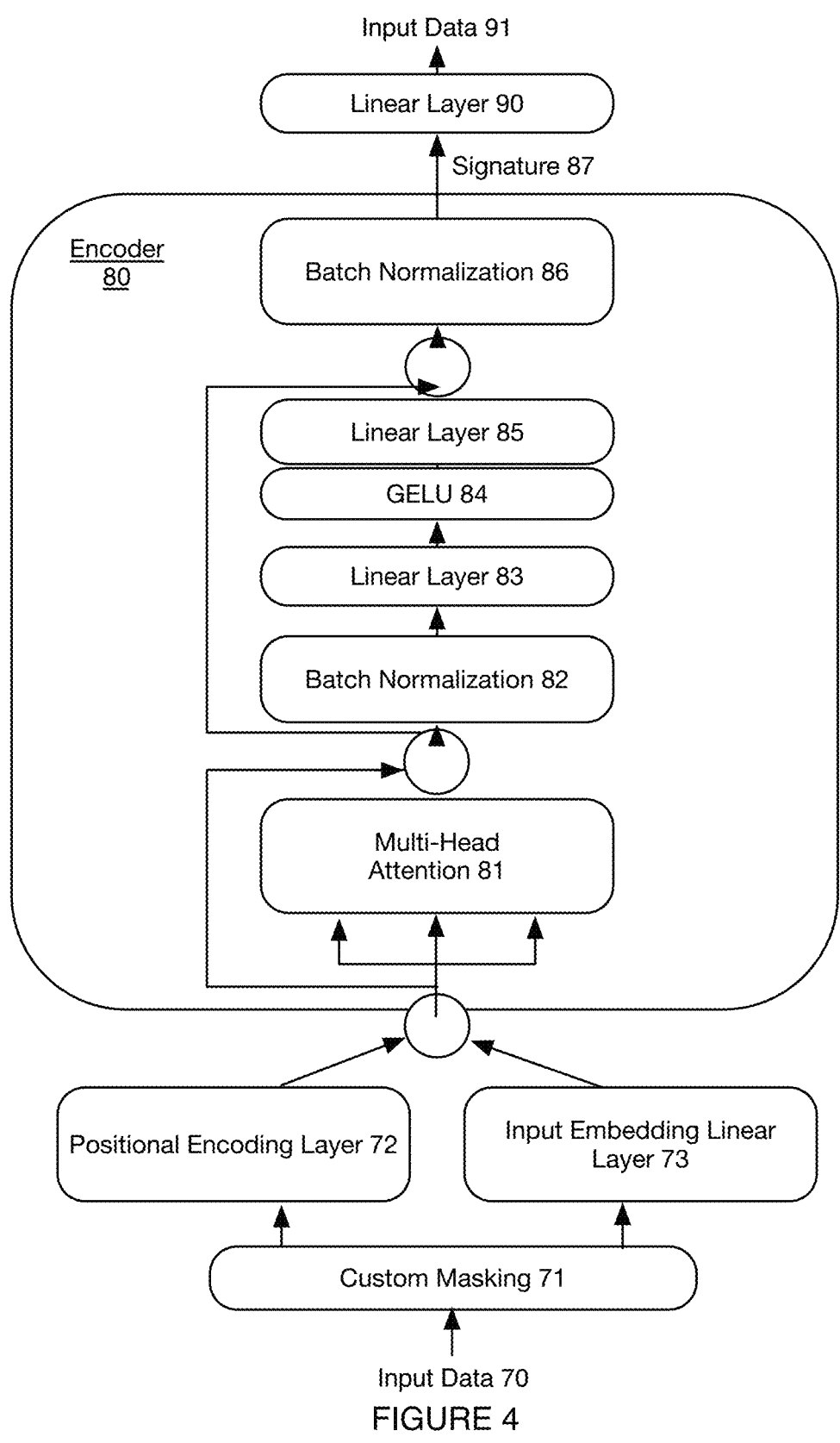
FIG. 4 depicts an example of attention-based model architecture for monitoring apparatuses.

FIG. 4 depicts a schematic of exemplary neural network architecture for the modified attention-based transformer encoder used to autoregress multivariate time series data of vibration in the apparatus, and/or subcomponents of the apparatus. In more detail with respect to model architecture, input data 70 is processed with a custom masking 71, followed by processing with a positional encoding linear layer 72 and an input embedding linear layer 73. Outputs of the positional encoding linear layer 72 and the input embedding linear layer 73 are then processed with an encoder block 80 including multi-head attention subarchitecture 81, followed by first batch normalization architecture 82, a first linear layer 83, a Gaussian error linear unit 84, a second linear layer 85, and second batch normalization architecture 86. Outputs of the encoder block include signature(s) 87, which are returned to a third linear layer 90 to generate second input data 91 (e.g., where autoregression architecture of the model is structured such that input data 91 is attempting to match input data 70, with iterative training).

The exemplary neural network architecture can include Pytorch implementation of a transformer encoder for multivariate time series containing 6 variables with a model dimension of size 128, 8 attention heads, a forward expansion of 4× in the feed-forward block, and a dropout fraction of 0.1 after batch normalization.

For electrical faults, input data can include one or more of: input current and voltage: This can be on one or multiple phases of the input as configured (e.g., a three-phase motor could need three independent sensors, where a refrigerator on single phase power would only require one sensor). Optionally, a vibrational sensor from the system described above could be included (e.g., for detection of vibration in 3 dimensions (X, Y, and Z)). Optionally, environmental sensors and variables such as temperature, pressure, humidity, light, and other sensors can be implemented. Depending on the power configuration individual line sensing for each phase of the motor could be implemented.

In relation to subsystems and equipment described, exemplary failure modes and other statuses that are returned by trained model architecture relate to prediction of a set of vibrational faults in including: harmonic faults, synchronous faults, sub-harmonic faults, sub-synchronous faults, non-synchronous faults, modulated faults, radial faults, axial faults, waveform faults, faults with multiple indications, and other faults, as described and shown in FIG. 2 Specific faults indications returned as outputs by the model in relation to a subcomponent of the apparatus or the apparatus can include one or more of: an unbalance fault, an eccentricity fault, a mechanical looseness fault, a gear tooth fault, an overhung unbalance fault, a belt drive alignment fault, an alignment offset fault, a bent shaft fault, an angular alignment fault, a cock bearing outer fault, a cock bearing inner fault, a gear mesh fault, a blade pass fault, a rotor bar fault, a rubbing fault, an assembly phase fault, a hunting tooth fault, an oil whirl fault, a belt frequency fault, a pole passing fault, an oil whipping fault, a turbulent flow fault, a turbulent cavitate fault, a cage frequency fault, an outer race fault, a natural frequency fault, an electric line frequency fault, a spin fault, a roll barring fault, a cage frequency fault, a rotor bar fault, a pole passing fault, a fluting fault, and other faults (e.g., an overhang fault related to outer race fault/inner race fault/cage fault/bearing fault, an underhang fault related to outer race fault/inner race fault/cage fault/bearing fault, faults related to rotor failure, electrical faults/shorts, bearing failure, blown fuses, tool or downstream damage (failure of connected device), transient power spikes, and failures. As such, the set of unique signatures can include features associated with a set of overhang faults of the apparatus, underhang faults of the apparatus, misalignment faults of the apparatus, imbalance faults of the apparatus, and multimodal faults of the apparatus.

Furthermore, previously unidentified signal features/signatures (e.g., new signals/signatures, interesting signals/signatures, etc.) can be returned by computing components during model refinement. In variations, such previously unidentified signal features/signatures can be processed and validated (e.g., with human validation, with other validation approaches), and once validated, the computing components can tag such signal features/signatures, such that additional instances of the signal features/signatures can be processed from other apparatus units for further model refinement and training.

While embodiments, variations, and examples of models (e.g., in relation to inputs, outputs, and training) are described above, models associated with the method 300 can additionally or alternatively include other blocks for statistical analysis of data and/or machine learning architecture.

Statistical analyses and/or machine learning algorithm(s) can be characterized by a learning style including any one or more of: supervised learning (e.g., using back propagation neural networks), unsupervised learning (e.g., K-means clustering), semi-supervised learning, reinforcement learning (e.g., using a Q-learning algorithm, using temporal difference learning, etc.), and any other suitable learning style.

Furthermore, any algorithm(s) can implement any one or more of: a regression algorithm, an instance-based method (e.g., k-nearest neighbor, learning vector quantization, self-organizing map, etc.), a regularization method, a decision tree learning method (e.g., classification and regression tree, chi-squared approach, random forest approach, multivariate adaptive approach, gradient boosting machine approach, etc.), a Bayesian method (e.g., naïve Bayes, Bayesian belief network, etc.), a kernel method (e.g., a support vector machine, a linear discriminate analysis, etc.), a clustering method (e.g., k-means clustering), an associated rule learning algorithm (e.g., an Apriori algorithm), an artificial neural network model (e.g., a back-propagation method, a Hopfield network method, a learning vector quantization method, etc.), a deep learning algorithm (e.g., a Boltzmann machine, a convolution network method, a stacked auto-encoder method, etc.), a dimensionality reduction method (e.g., principal component analysis, partial least squares regression, etc.), an ensemble method (e.g., boosting, boot strapped aggregation, gradient boosting machine approach, etc.), and any suitable form of algorithm.

Unlike conventional approaches that record data, store data internal to a device, stream data to the cloud, and subsequently analyze vibration data offline, the systems and methods described herein are built around predicting and forecasting failure on the device itself, with edge deployment capability. Implementing prediction on device removes the need to stream all acquired data to the cloud and batch level predictions on the equipment. In particular, an extremely beneficial aspect of the inventions involves transferring only insights (e.g., on the edge), and not entire data streams, with respect to the discussed edge deployment applications. Thus, the systems and methods described decrease the time and overhead needed to achieve an actionable insight. Embodiments of the inventions integrate software and hardware on the sensing device itself to achieve such goals.

Figure 5:
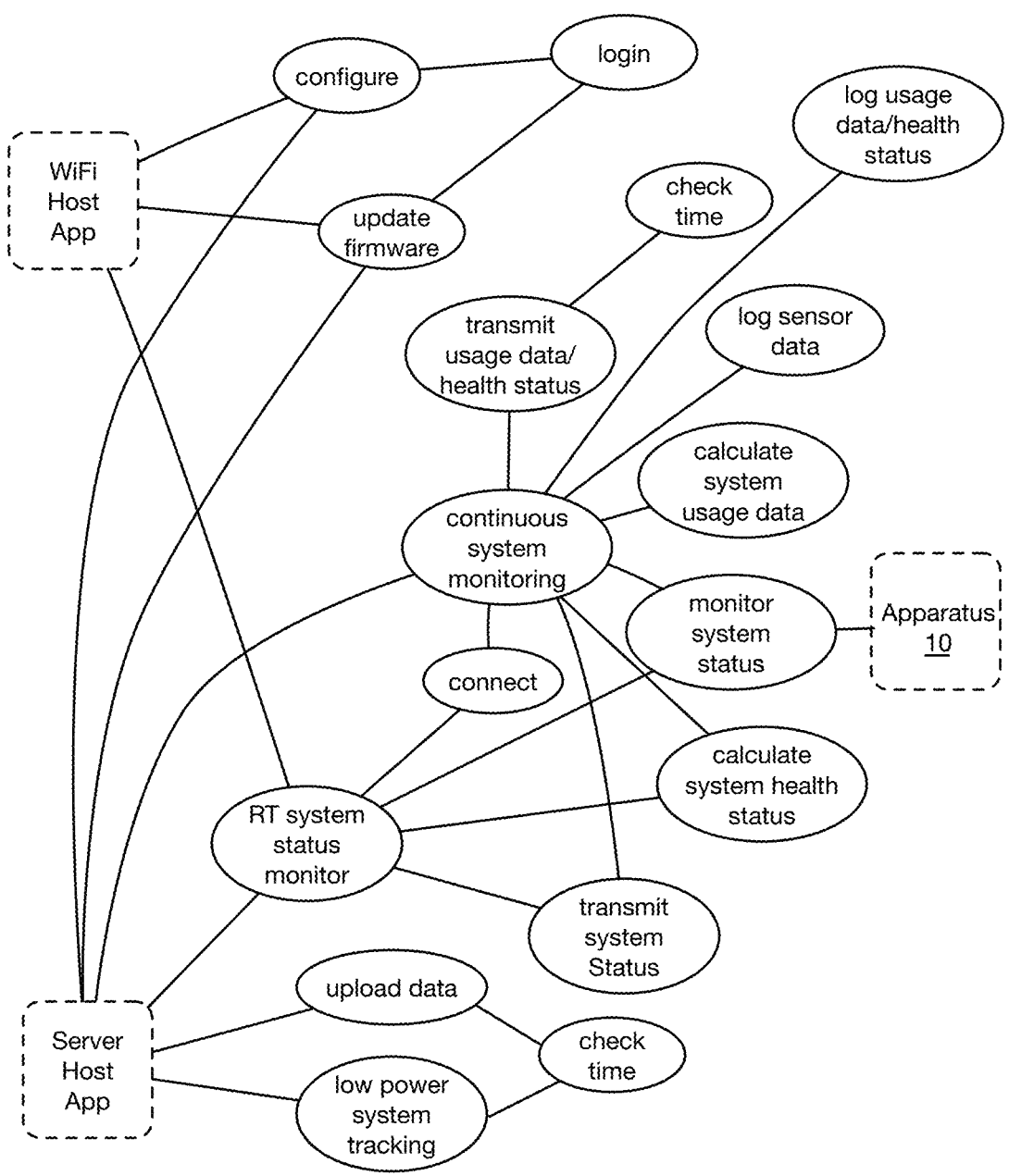
FIG. 5 depicts flow of various use cases associated with an embodiment of a system for apparatus monitoring.

However, non-edge deployment implementations are also applicable. FIG. 5 depicts use cases associated with the signal conditioning and communications subsystem 130, with interfaces between a wireless communication (e.g., WiFi) host application, a server host application (e.g., associated with processing subsystem 140 described below), and an apparatus 10. In FIG. 5, the signal conditioning and communications subsystem 130 interfaces with the apparatus 10 and logs sensor data from the sensor subsystem 110, with logging of apparatus data for associated status determinations related to components and subcomponents of the apparatus.

The signal conditioning and communications subsystem 130 can perform various signal conditioning operations, in order to provide compatibility with measurement and/or control systems, and/or in relation to pre-processing of signal data for use as inputs into models described in further detail below. Signal conditioning operations can include processes such as amplification, filtering, isolation (of sensitive components), and digitization, and other processes. Filtering can eliminate unwanted noise or interference from the signal (on-chip), in order to provide a cleaner and more reliable output, where algorithms for filtering are described in further detail below.

Signals can then be processed by model architecture described below, in order to generate outputs pertaining to health statuses of the apparatus 10 and subcomponents of the apparatus 10. Exemplary components of the apparatus 10 can include motor components (e.g., shaft components, fan components, rotor components, bearing components, sheave components, cylinder components, piston components, etc.). Subcomponents can also include associated components, such as contaminants, liquids (e.g., oils, etc.), and/or other components.

In relation to health statuses, the signal processing and communications subsystem 130 and/or processing subsystem 140 described below can return notifications associated with maintenance event flags, pertaining to one or more of: component replacement (e.g., of bearings, of rotor components, of shaft components, of cylinder components, of filter components), presence of contaminants (e.g., water, dust, grease, etc.), misalignments (e.g., of sheaves), single phasing operations, other failure modes, and overall system statuses. Usage data can also be returned and be associated with one or more of: cycle count, cycle time (e.g., average), route segment time (e.g., average), pump demand (e.g., average RPM), dry valve usage, GPS location, and other usage data.

The signal processing and communications subsystem 130 also transmits pre-conditioned data, apparatus usage data, and other system statuses over wireless communications for further processing (e.g., using communications components described above). The signal processing and communications subsystem 130 also receives firmware updates and/or configurational aspects (e.g., by way of a host application), and transmits data and power management information (e.g., related to low power operations) to the server host application. An example continuous monitoring mode, data transmission mode, low power mode, real-time system monitoring by server host application mode, real-time system monitoring by host application mode, configuration mode, and firmware update mode are described below:

In more detail, in continuous monitoring modes of operation, the signal processing and communications subsystem 130 interacts with the apparatus 10 and the server host application, and with operation of the apparatus 10, the signal processing and communications subsystem 130 monitors apparatus 10 usage (e.g., at subcomponent and global levels), health statuses (e.g., at subcomponent and global levels), and other system statuses. The signal processing and communications subsystem 130 also logs receives and logs data from the sensor subsystem 110. The signal processing and communications subsystem 130 also transmits data to the server host application by wireless communications, as described above (and buffers data with repeated transmission attempts if transmission is unsuccessful).

In more detail, in data transmission modes of operation, the signal processing and communications subsystem 130 receives signals generated from the apparatus 10, and interacts with the server host application. The signal processing and communications subsystem 130 verifies that time is within a suitable data transmission time window, and uploads data (e.g., time series sensor data) to the server by wireless communications, as described above. The signal processing and communications subsystem 130 can transition to a low power mode of operation (described in the immediately following paragraph), and/or buffer data with repeated transmission attempts if transmission is unsuccessful.

In more detail, in low power modes of operation, the signal processing and communications subsystem 130 receives signals generated from the apparatus 10, and interacts with the server host application, and/or an operator of the apparatus 10. With successful data transmission to the server or a maximum number of unsuccessful data transmission attempts exceeded, the signal processing and communications subsystem 130 enters a low power mode of operation, periodically transmits status information to the server, and monitors battery status of the signal processing and communications subsystem 130. In the event that the signal processing and communications subsystem 130 enters a critical battery status, the signal processing and communications subsystem 130 powers off peripherals, removes power from the controller of the signal processing and communications subsystem 130, and/or performs other low power operation modes.

In more detail, in real-time system monitoring by server host application modes of operation, the signal processing and communications subsystem 130 receives signals generated from the apparatus 10, and interacts with the server host application. The server host application connects with the controller of the monitor 130, which streams data to the server host application. With processing, analyses (e.g., in relation to health statuses and other returned outputs) are presented to an operator of the apparatus 10. In variations, the server host application can request to disconnect from the signal processing and communications subsystem 130, which closes the connection. In alternate flows, with connection initiation failure or connection disconnect failure, the server host application can attempt to connect or disconnect a threshold number of times.

In more detail, in real-time system monitoring by host application modes of operation, the signal processing and communications subsystem 130 interacts with the apparatus 10 and the server host application. The host application connects with the controller of the signal processing and communications subsystem 130, which streams data to the server host application. With processing, analyses (e.g., in relation to health statuses and other returned outputs) are presented to an operator of the apparatus 10. In variations, the server host application can request to disconnect from the signal processing and communications subsystem 130, which closes the connection. In alternate flows, with connection initiation failure or connection disconnect failure, the server host application can attempt to connect or disconnect a threshold number of times.

In configuration modes of operation, the signal processing and communications subsystem 130 interacts with the server host application and the apparatus 10, for configuration adjustments.

In firmware update modes of operation, the signal processing and communications subsystem 130 interacts with the server host application and/or the apparatus 10, to receive firmware updates.

Figure 6:
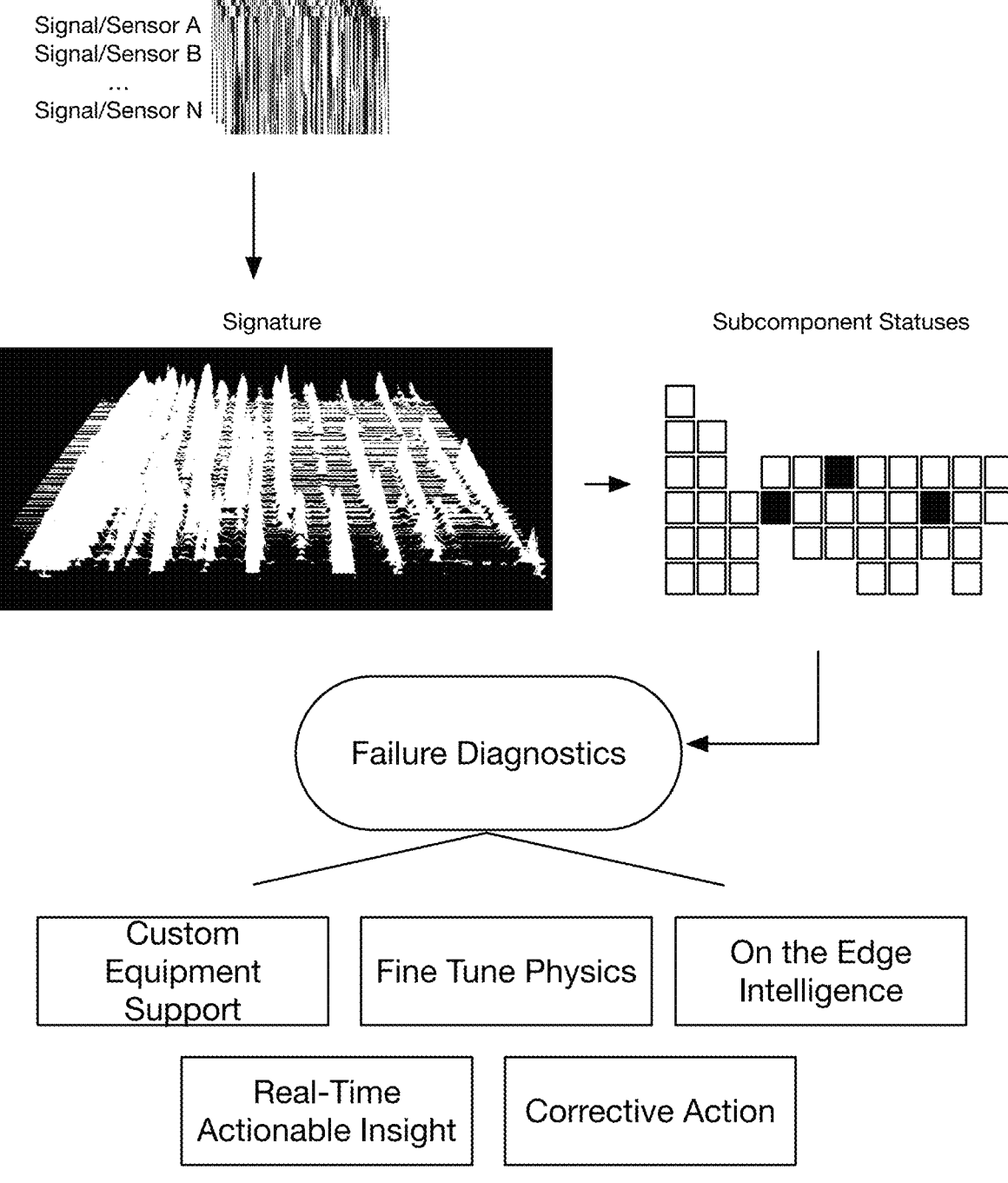
FIG. 6 depicts a variation of a flow of the method for apparatus monitoring.

The system embodiment(s) can, however, be configured to implement other workflows including variations of those described, and/or other workflows (examples, variations, and embodiments of which are shown in FIG. 6).

3.3 Method-Actionable Insights and Downstream Applications

Block S340 recites: returning an analysis including a recommended action for improving or maintaining proper performance of the apparatus, based upon the set of unique signatures. Block S340 functions to process any returned signatures from prior steps, to generate analyses pertaining to health of the apparatus, efficacy of operations, efficiency of operations, and/or other actionable insights.

In embodiments, outputs of Block S340 can be used to guide recommended actions for improving operation of the apparatus or maintaining proper operation of the apparatus (e.g., with optional execution of recommended actions in Block S350).

In variations, recommended actions can include or be associated with one or more of: maintaining normal operation of subcomponents; responding to failed operation (e.g., misalignments, breaking, phase issues, etc.) of subcomponents; proactively correcting borderline operation (e.g., near failure) of subcomponents; responding to or otherwise correcting other undesired statuses of one or more of subcomponents of the apparatus being monitored; providing information regarding subcomponent power consumption; performing inventory operations related to anticipated statuses of subcomponents (e.g., in relation to maintaining or adjusting inventory related to replacement subcomponents of a apparatus); performing decision-making guidance (e.g., in relation to cost-benefit analyses of replacing vs. repairing subcomponents or apparatuses); facilitating proactive management of deployed equipment (e.g., individual apparatuses, equipment of a fleet, etc.); and performing other suitable actions.

Figure 7:
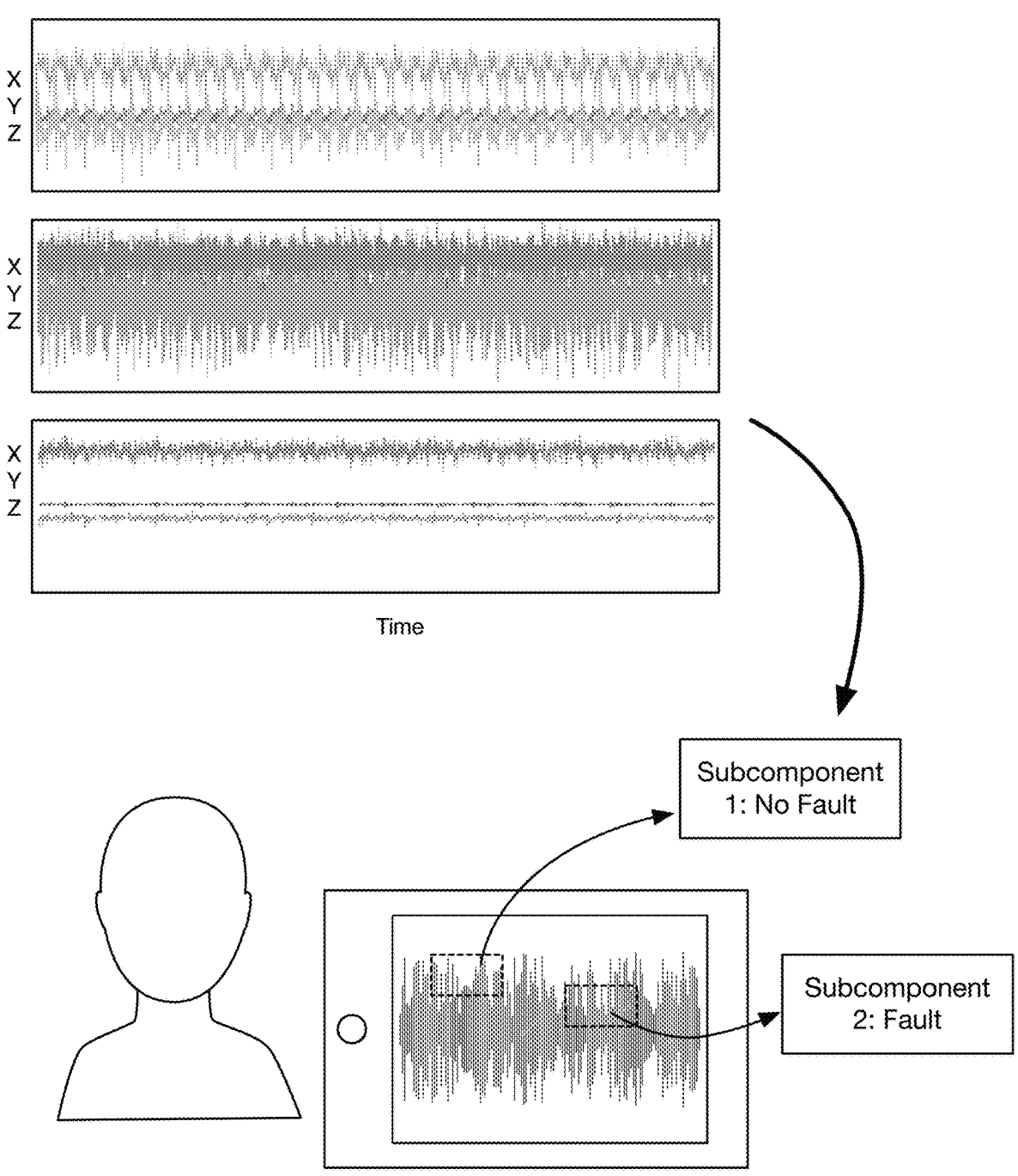
FIG. 7 depicts an example of an interface for a operator of interest in apparatus monitoring.

In an example, the analysis can indicate failure of a subcomponent of an unmanned aerial vehicle from unique signatures of Block S330, and execute actions for adjusting flight operations (with autonomous flight systems and/or remote flight operators) such that the aerial vehicle can be operated and/or retrieved safely. Here, the recommended action can include controlling flight operation of the unmanned aerial vehicle in response to a fault of at least one of the set of subcomponents. In some situations, the executed action can initiate an autodestruct operation of the aerial vehicle, such that the vehicle cannot be retrieved (e.g., if a fault cannot be addressed in a suitable duration of time). In another example, the executed action can include remote deactivation of an apparatus for security reasons (e.g., related to energy infrastructure, related to defense, etc.). Here, the recommended action can include shutting down an electric utility apparatus. In another example, Block S340 can trigger a notification to perform a maintenance check upon detecting a high number of events associated with a specific component of an apparatus (e.g., based on unique signatures of Block S330). In generating the analysis for this example, models associated with Block S330 can process mean time between failure (MTBF) for various subcomponents in order to predict the likelihood of failure within a given time period. In another example, as shown in FIG. 7, Block S340 can return an analysis visualizing various scenarios for a subcomponent, in relation to extracted signatures and returned fault(s) present. In some variations, the user interface of FIG. 7 can be adapted, such that the user can interrogate signal data for specific groups of fault types (e.g., fault group types described above, overhang faults, underhang faults, misalignment faults, imbalance faults, multi-modal faults, etc.), where the user interface can run through each fault group, and indicate presence, absence, and/or severity of detected faults.

In generating recommended actions, Block S340 can include returning notifications or other information derived from the analyses in a visual format, in an audio format, in a haptic format, and/or in any other suitable observable format. As such, variations of Block S340 can include generating digital objects (e.g., in visual data formats, in audio data formats, in haptic data formats) or instructions for generating digital objects, in communication with client devices (e.g., devices that are associated with operators of the apparatuses), where the client devices include visual output components (e.g., a display), audio output components (e.g., speaker), haptic output components (e.g., vibrators), and/or any other suitable components. Client devices can also include input components (e.g., keypads, touch displays, microphones, joysticks, mice, etc.) such that the operators or other entities associated with the apparatus can communicate inputs (e.g., commands) related to the generated analyses.

In returning the analysis, Block S340 can include providing information in an automated manner based on thresholds that can be manually set at first and then later adjusted by the AI/NN based on confidence optimization or other factors. Block S340 can, however, include generation of analyses for other suitable recommended actions, provided in another suitable manner.

Block S350 recites: executing the recommended action, which functions to automatically execute recommended actions in order to reduce operator workload in relation to apparatus management.

Executed actions can include or be associated with one or more of: responding to or otherwise correcting undesired statuses of one or more of subcomponents of the apparatus being monitored; performing inventory operations related to anticipated statuses of subcomponents (e.g., in relation to maintaining or adjusting inventory related to replacement subcomponents of an apparatus); performing decision-making guidance (e.g., in relation to cost-benefit analyses of replacing vs. repairing subcomponents or apparatuses); facilitating proactive management of deployed equipment (e.g., individual apparatuses, equipment of a fleet, etc.); and performing other suitable actions.

In an example, the analysis can indicate various faults of one or more subcomponents, and Block S350 can execute instructions for correcting the faulty subcomponent statuses. In another example, Block S350 can initiate automatic performance of a maintenance check upon detecting a high number of events associated with a specific cylinder of an apparatus (e.g., based upon the analysis generated by way of Block S340), with automated execution of a purchase of replacement parts. In another example, Block S350 can automatically readjust inventory (e.g., by stopping orders of replacement components that still have long useful lives, by increasing orders of replacement components that are near the end of their useful lives, etc.) based upon an analysis generated by way of Block S340.

In executing recommended actions, Block S350 can include functionality for generating, transmitting, and/or executing instructions in a computer-readable format and stored in non-transitory media. In variations, such instructions can be generated, transmitted, and/or stored on components of the processing subsystem, client devices, inventory management platforms, vehicle computer architecture (e.g., firmware), industrial apparatus computer architecture (e.g., firmware), and/or other suitable components.

The system embodiment(s) can, however, be configured to implement other workflows including variations of those described, and/or other workflows.

4. Computer Systems

Figure 8:
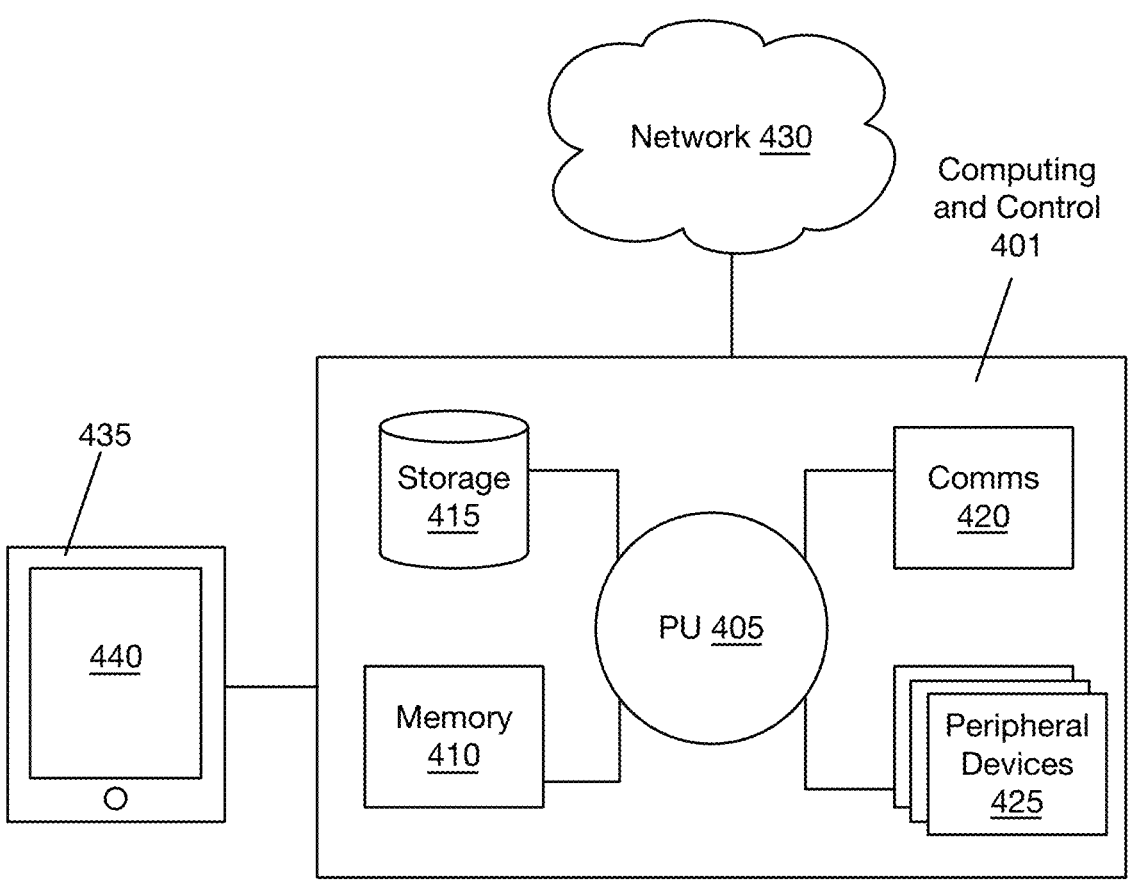
FIG. 8 depicts example computing architecture of a system for apparatus monitoring.

The present disclosure provides computing and control subsystems that are programmed to implement methods associated with the monitoring and prediction devices described. FIG. 8 shows a computing and control subsystem 401 that is programmed or otherwise configured to, for example, provide monitoring capabilities for apparatuses described (e.g., according to method 300 and system 100).

The computing and control subsystem 401 includes architecture for processing and transmitting data (e.g., vibration data, electrical signal data, etc.) detected from said apparatuses.

The computing and control subsystem 401 can include a processing unit (neural and/or central processing unit) 405, which can be a single core or multi core processor, or a plurality of processors for parallel processing. The computing and control subsystem 401 also includes memory or memory location 410 (e.g., random-access memory, read-only memory, flash memory), electronic storage unit 415, communication interface 420 (e.g., network adapter) for communicating with one or more other systems, and peripheral devices 425, such as cache, other memory, data storage and/or electronic display adapters. The memory 410, storage unit 415, interface 420 and peripheral devices 425 are in communication with the processing unit 405 through a communication bus (solid lines), such as a motherboard. The storage unit 415 can be a data storage unit (or data repository) for storing data. The computer system 401 can be operatively coupled to a computer network ("network") 430 with the aid of the communication interface 420, but also diagnose and generate outputs on-chip. The network 430 can be the Internet, an internet and/or extranet, or an intranet and/or extranet that is in communication with the Internet.

In some embodiments, the network 430 is a telecommunication and/or data network. The network 430 can include one or more computer servers, which can enable distributed computing, such as cloud computing. For example, one or more computer servers may enable cloud computing over the network 430 ("the cloud") to perform various aspects of facilitating charging of an electric vehicle, with desired security, authentication, and locking functionalities associated with various types of charging sessions and/or different users. Such cloud computing may be provided by cloud computing platforms such as, for example, Amazon Web Services (AWS), Microsoft Azure, Google Cloud Platform, and IBM cloud. In some embodiments, the network 430, with the aid of the computer system 401, can implement a peer-to-peer network, which may enable devices coupled to the computer system 101 to behave as a client or a server.

The processing unit 405 can include one or more computer processors and/or one or more neural processing units (NPUs). The processing unit 405 can execute a sequence of machine-readable instructions, which can be embodied in a program or software. The instructions may be stored in a memory location, such as the memory 410. The instructions can be directed to the processing unit 405, which can subsequently program or otherwise configure the processing unit 405 to implement methods of the present disclosure. Examples of operations performed by processing unit 405 can include fetch, decode, execute, and writeback. The processing unit 405 can be part of a circuit, such as an integrated circuit. One or more other components of the computing and control subsystem 401 can be included in the circuit. In some embodiments, the circuit is an application specific integrated circuit (ASIC).

The storage unit 415 can store files, such as drivers, libraries and saved programs. The storage unit 415 can store user data, e.g., user preferences and user programs. In some embodiments, the computer system 401 can include one or more additional data storage units that are external to the computer system 401, such as located on a remote server that is in communication with the computer system 801 through an intranet or the Internet.

The computing and control subsystem 401 can communicate with one or more remote computer systems through the network 430. For instance, the computer system 401 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 401 via the network 430.

Methods as described herein can be implemented by way of machine (e.g., computer processor) executable code stored on an electronic storage location of the computing and control subsystem 401, such as, for example, on the memory 410 or electronic storage unit 415. The machine executable or machine-readable code can be provided in the form of software. During use, the code can be executed by the processor 405. The code can be pre-compiled and configured for use with a machine having a processer adapted to execute the code, or can be compiled during runtime. The code can be supplied in a programming language that can be selected to enable the code to execute in a pre-compiled or as-compiled fashion.

Embodiments of the systems and methods provided herein, such as the computing and control subsystem 401, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, or disk drives, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computing and control subsystem 401 can include or be in communication with an electronic display 435 that comprises a user interface (UI) 840 for providing, for example, a visual display indicative of statuses associated with charging of an electric vehicle, security information, authentication information, and locking statuses associated with various types of charging sessions and/or different users. Examples of UIs include, without limitation, a graphical user interface (GUI) and web-based user interface.

Methods and systems of the present disclosure can be implemented by way of one or more algorithms. An algorithm can be implemented by way of software upon execution by the central processing unit 405. The algorithm can, for example, facilitate charging of an electric vehicle, with desired security, authentication, and locking functionalities associated with various types of charging sessions and/or different users.

In one set of embodiments, methods implemented by way of or as supported by the computing and control subsystem 401 can include methods for communication of statuses of apparatus 10 and subcomponents to another device (e.g., mobile computing device, wearable computing device, other smart device, etc.). Communicated statuses can then be used by the system 100 to return notifications (e.g., to an apparatus operator or manager, to another entity) and/or execute other actions pertaining to statuses of the apparatus 10, where example executed actions can include generation of instructions to control states of the apparatus for safety, or to address faults identified as described above. and/or generation of instructions to control states of the electric vehicle.

Additionally or alternatively, the computing and control subsystem 401 can include architecture with programming to execute other suitable methods.

5. Conclusions

The FIGURES illustrate the architecture, functionality and operation of possible implementations of systems, methods and computer program products according to preferred embodiments, example configurations, and variations thereof. In this regard, each block in the flowchart or block diagrams may represent a module, segment, or portion of code, which comprises one or more executable instructions for implementing the specified logical function(s). It should also be noted that, in some alternative implementations, the functions noted in the block can occur out of the order noted in the FIGURES. For example, two blocks shown in succession may in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

What is claimed is:

1. A system for monitoring an apparatus comprising a motor, the system comprising:
   a vibration sensor comprising a multi-axis accelerometer;
   a housing surrounding the vibration sensor;
   a mounting interface coupled to the housing and configured to couple the system to the apparatus away from the motor;
   a signal conditioning and communications subsystem coupled to the vibration sensor within the housing and configured to receive a vibration signal stream from the vibration sensor; and
   a processing subsystem coupled to the signal conditioning and communications subsystem and comprising a neural processing unit (NPU), the processing subsystem contained within the housing and comprising non-transitory media storing instructions that, when executed, perform operations for:
   receiving vibration data derived from the vibration signal stream;
   performing a set of transformation operations upon said vibration data;
   identifying a set of unique signatures corresponding to states of a set of subcomponents of the apparatus, from the set of transformation operations, wherein the set of unique signatures comprises signatures associated with a set of harmonic faults of the apparatus, a set of synchronous faults of the apparatus, a set of subharmonic and sub-synchronous faults of the apparatus, and a set of non-synchronous faults of the apparatus; and returning an analysis comprising a recommended action for improving or maintaining proper performance of the apparatus, based upon the set of unique signatures.

2. The system of claim 1, wherein the NPU is an NPU with 1 trillions of operations per second (TOPS) capability with energy use performance of less than 1 picojoule per operation.

3. The system of claim 1, wherein NPU comprises self-attention time-series transformer architecture comprising an encoder block comprising multi-head attention subarchitecture.

4. The system of claim 3, wherein the self-attention time-series transformer architecture of the NPU omits a decoder block.

5. The system of claim 1, wherein the apparatus comprises an unmanned aerial vehicle.

6. The system of claim 5, wherein the set of subcomponents comprises subcomponents of an engine of the unmanned aerial vehicle and flight control surfaces of the unmanned aerial vehicle.

7. The system of claim 1, wherein the apparatus comprises an electric utility apparatus.

8. The system of claim 1, wherein the set of subcomponents comprises a bearing, a shaft, a belt, and a gear of the apparatus.

9. A system for monitoring an apparatus comprising a motor, the system comprising:
   a vibration sensor comprising a multi-axis accelerometer;
   a housing surrounding the vibration sensor;
   a mounting interface coupled to the housing and configured to couple the system to the apparatus away from the motor;
   a signal conditioning and communications subsystem coupled to the vibration sensor within the housing and configured to receive a vibration signal stream from the vibration sensor; and
   a processing subsystem coupled to the signal conditioning and communications subsystem and comprising a neural processing unit (NPU), the processing subsystem contained within the housing and comprising on-chip self-attention time-series transformer architecture for processing a vibration signal stream, wherein the processing subsystem comprises non-transitory media storing instructions that, when executed, perform operations for:
   receiving vibration data derived from the vibration signal stream;
   performing a set of transformation operations upon said vibration data;
   identifying a set of unique signatures corresponding to states of a set of subcomponents of the apparatus, from the set of transformation operations, wherein the set of unique signatures comprises signatures associated with a set of overhang faults of the apparatus, underhang faults of the apparatus, misalignment faults of the apparatus, imbalance faults of the apparatus, and multimodal faults of the apparatus; and
   returning an analysis comprising a recommended action for improving or maintaining proper performance of the apparatus, based upon the set of unique signatures.

10. A method for monitoring an apparatus, the method comprising:
    providing a mounting interface between a vibration sensor coupled to a signal processing subsystem, and the apparatus, without direct contact between the vibration sensor and a motor of the apparatus, wherein the vibration sensor comprises a multi-axis accelerometer;

sampling a vibration signal stream generated from the vibration sensor during operation of the apparatus;

performing a set of transformation operations upon the vibration signal stream, wherein the set of transformation operations comprises operations applied by self-attention time-series transformer architecture;

identifying a set of unique signatures corresponding to faults of a set of subcomponents of the apparatus from the set of transformation operations, wherein the set of unique signatures comprises signatures associated with a set of harmonic faults of the apparatus, a set of synchronous faults of the apparatus, a set of sub-harmonic and sub-synchronous faults of the apparatus, and a set of non-synchronous faults of the apparatus; and returning an analysis comprising a recommended action for improving or maintaining proper performance of the apparatus, based upon the set of unique signatures.

11. The method of claim 10, wherein said self-attention time-series transformer architecture comprises an encoder block comprising multi-head attention subarchitecture.

12. The method of claim 11, wherein said self-attention time-series transformer architecture omits a decoder block.

13. The method of claim 10, wherein the apparatus comprises an unmanned aerial vehicle and wherein the set of subcomponents comprises subcomponents of an engine and flight control surfaces of the unmanned aerial vehicle.

14. The method of claim 13, further comprising executing the recommended action, wherein the recommended action comprises controlling flight operation of the unmanned aerial vehicle in response to a fault of at least one of the set of subcomponents.

15. The method of claim 10, wherein the apparatus comprises an electric utility apparatus.

16. The method of claim 15, further comprising executing the recommended action, wherein the recommended action comprises shutting down the electric utility apparatus.

* * * * *